(12) United States Patent
Uzawa

(10) Patent No.: US 7,873,218 B2
(45) Date of Patent: Jan. 18, 2011

(54) FUNCTION APPROXIMATION PROCESSING METHOD AND IMAGE PROCESSING METHOD

(75) Inventor: Mitsuru Uzawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1200 days.

(21) Appl. No.: 11/109,851

(22) Filed: Apr. 20, 2005

(65) Prior Publication Data

US 2005/0238244 A1 Oct. 27, 2005

(30) Foreign Application Priority Data

| Apr. 26, 2004 | (JP) | 2004-130192 |
| May 31, 2004 | (JP) | 2004-161571 |

(51) Int. Cl.
| G06K 9/00 | (2006.01) |
| G06K 9/34 | (2006.01) |
| G06K 9/46 | (2006.01) |
| G06K 9/48 | (2006.01) |
| G06K 9/66 | (2006.01) |
| G06K 9/40 | (2006.01) |
| G06K 15/00 | (2006.01) |
| G06T 11/20 | (2006.01) |
| H04N 1/40 | (2006.01) |
| H04N 1/403 | (2006.01) |
| H04N 1/46 | (2006.01) |

(52) U.S. Cl. ............ 382/199; 382/100; 382/173; 382/190; 382/266; 358/2.99; 358/462; 358/500; 345/442

(58) Field of Classification Search ........... 382/181, 382/185, 190, 195, 199–200; 358/1.1, 2.99, 358/3.01, 400, 462, 500; 345/440–443, 647, 345/657, 679

See application file for complete search history.

(56) References Cited

U.S. PATENT DOCUMENTS

| 5,253,336 A | 10/1993 | Yamada ................... 395/142 |
| 5,500,927 A * | 3/1996 | Sander-Cederlof et al. .. 345/442 |
| 5,900,948 A * | 5/1999 | Shigeeda et al. ........... 358/448 |
| 5,933,528 A | 8/1999 | Katayama et al. |
| 6,903,742 B1 * | 6/2005 | Fushiki et al. ............. 345/443 |

(Continued)

FOREIGN PATENT DOCUMENTS

JP   2-93879   4/1990

(Continued)

OTHER PUBLICATIONS

Cinque et. al., "Shape Descriptoion Using Cubic Polynomial Bezier Curves", Pattern Recognition Letters 19, 1998, pp. 821-828, Elsevier Science.*

(Continued)

*Primary Examiner*—Vu Le
*Assistant Examiner*—Nathan Bloom
(74) *Attorney, Agent, or Firm*—Fitzpatrick, Cella, Harper & Scinto

(57) ABSTRACT

A function approximation processing method comprises inputting and binarizing image data, extracting contour from the binarized image data, estimating tangent points in horizontal and vertical directions from the contour, and approximating contour between adjacent tangent points among the estimated tangent points with a predetermined function, thereby an input object such as a character or a figure can be processed at high speed, and outline data with high image quality can be generated with a reduced number of points.

10 Claims, 43 Drawing Sheets

U.S. PATENT DOCUMENTS

| | | | | |
|---|---|---|---|---|
| 2002/0145616 | A1* | 10/2002 | Doan | 345/629 |
| 2004/0136609 | A1* | 7/2004 | Ichikawa et al. | 382/284 |
| 2004/0247206 | A1* | 12/2004 | Kaneda et al. | 382/305 |
| 2006/0155464 | A1* | 7/2006 | Smartt | 701/208 |

FOREIGN PATENT DOCUMENTS

| | | |
|---|---|---|
| JP | 3-048375 | 3/1991 |
| JP | 3-105574 | 5/1991 |
| JP | 5-108823 | 4/1993 |
| JP | 6-12488 | 1/1994 |
| JP | 6-282658 | 10/1994 |
| JP | 7-085110 | 3/1995 |
| JP | 8-153191 | 6/1996 |
| JP | 9-134441 | 5/1997 |

OTHER PUBLICATIONS

Elber et al., "Comparing Offset Curve Approximation Methods", IEEE, Computer Graphics and Applications, vol. 17, No. 3, pp. 62-71, May/Jun. 1997.*

Chang and Yan, "Vectorization of Hand-Drawn Image Using Piecewise Cubic Bezier Curves Fitting", Pattern Recognition, vol. 31, No. 11, pp. 1747-1755, Elsevier Science Ltd Mar. 1998.*

Sohel et al., "Enhanced Bezier Curve Models Incorporating Local Information", Acoustics, Speech, and Signal Processing, 2005. Proceedings. (ICASSP '05). IEEE International Conference on, vol. 4, No., pp. 253- 256 vol. 4, Mar. 18-23, 2005.*

Sederberg, T.W. and Farouki, R.T.; , "Approximation by interval Bezier curves," Computer Graphics and Applications, IEEE, vol. 12, No. 5, pp.87-95, Sep. 1992.*

"Space-Efficient Outlines from Image Data via Vertex Minimization and Grid Constrains", Graphical Models and Image Processing vol. 59 No. 2, pp. 73-88 (1997).

Office Action, dated May 29, 2009, iin JP 2004/130192.

"Optimal Piecewise Linear Approximation of Plane Curves", SATO, The Institute of Electronics, Information and Communication Engineers Paper Sep. 1982 vol. J65-D No. 9, pp. 1144-1150.

"Paper Document Digitization Using Function Figure Representation", Mori Kohichi, Wada Hohichi and Toraichi Kazuo, Information Processing Society of Japan Report vol. 99, No. 57, pp. 17-23.

Office Action, dated May 25, 2009, in JP 2004-161571.

* cited by examiner

FIG. 5

BLOCK INFORMATION

| | ATTRIBUTE | COORDINATE X | COORDINATE Y | WIDTH W | HEIGHT H | OCR INFORMATION |
|---|---|---|---|---|---|---|
| BLOCK 1 | 1 | X1 | Y1 | W1 | H1 | PRESENT |
| BLOCK 2 | 3 | X2 | Y2 | W2 | H2 | PRESENT |
| BLOCK 3 | 2 | X3 | Y3 | W3 | H3 | ABSENT |
| BLOCK 4 | 1 | X4 | Y4 | W4 | H4 | PRESENT |
| BLOCK 5 | 3 | X5 | Y5 | W5 | H5 | PRESENT |
| BLOCK 6 | 5 | X6 | Y6 | W6 | H6 | ABSENT |

*ATTRIBUTE 1 : text 2 : picture 3 : table 4 : line 5 : photo

BLOCK INFORMATION

| TOTAL NUMBER OF BLOCKS | N (=6) |
|---|---|

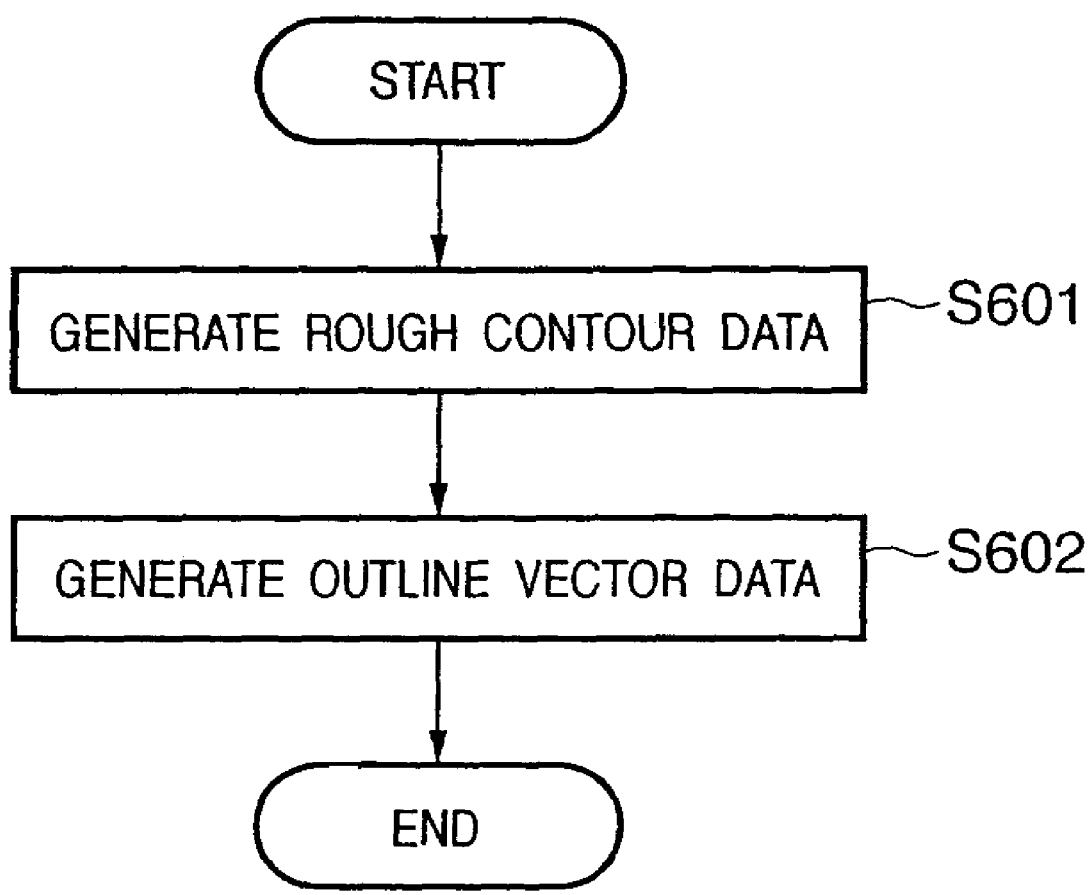

F I G. 11A 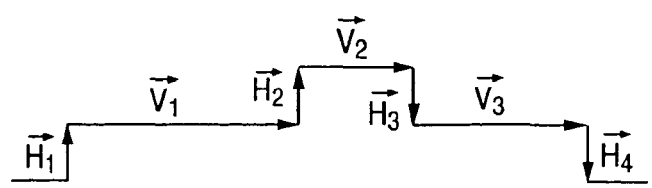
F I G. 11B 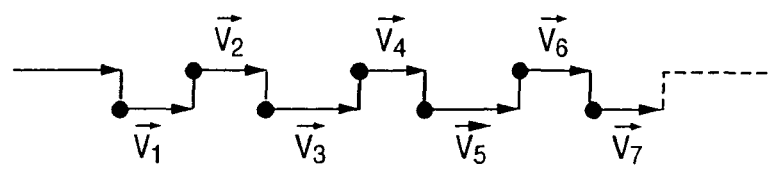
F I G. 11C 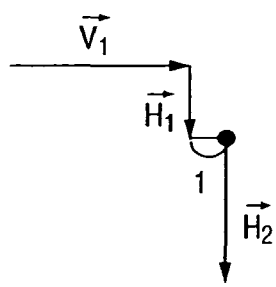

FIG. 12
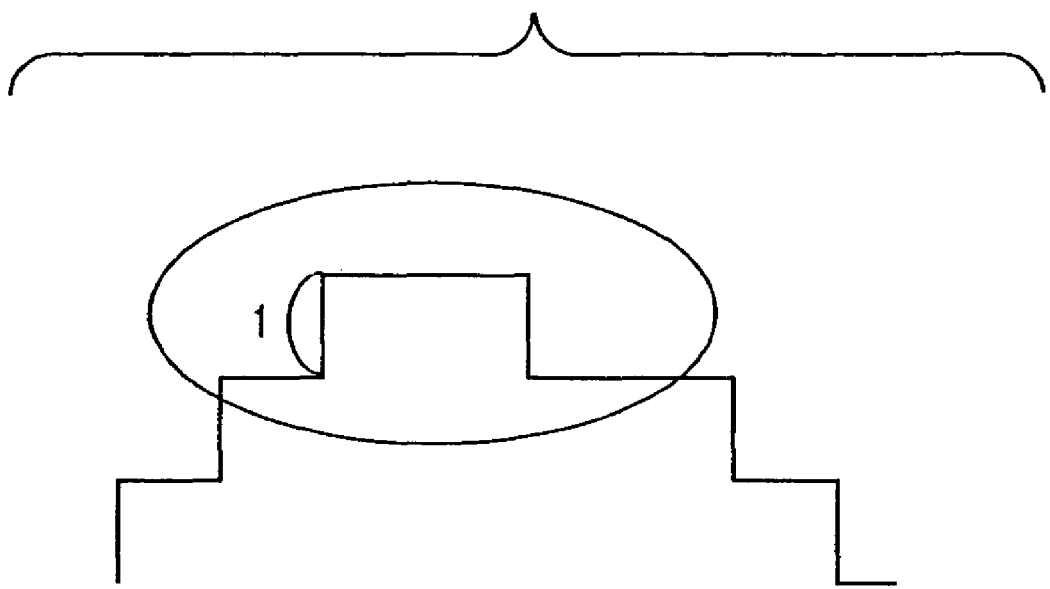
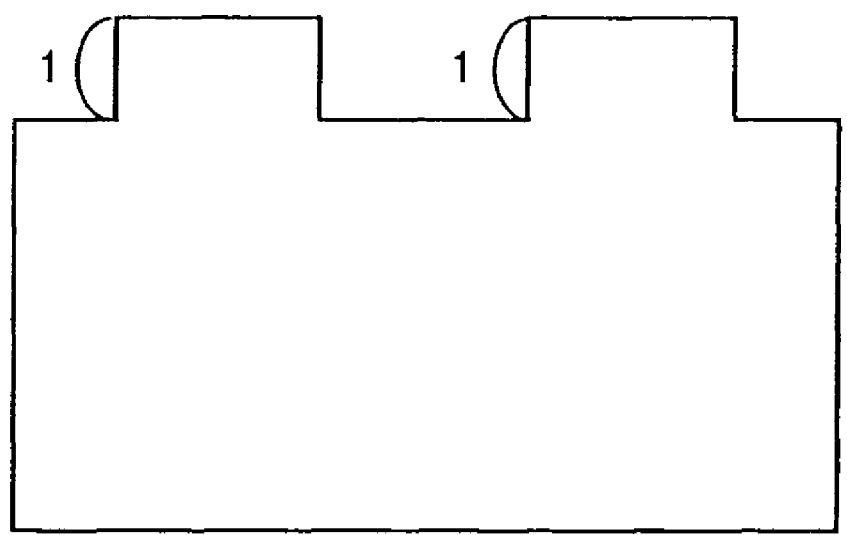

F I G. 15A
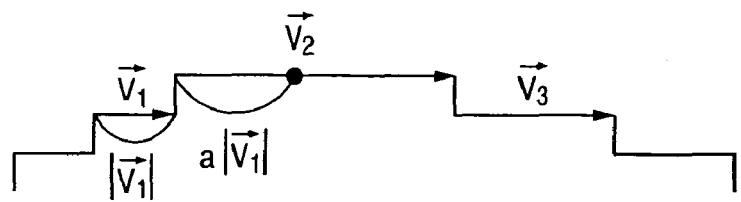
F I G. 15B
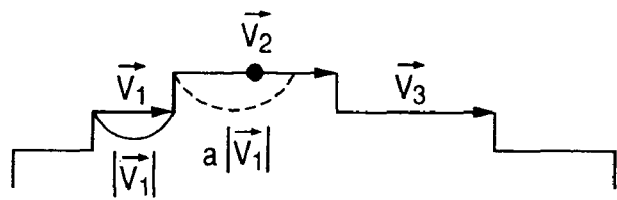

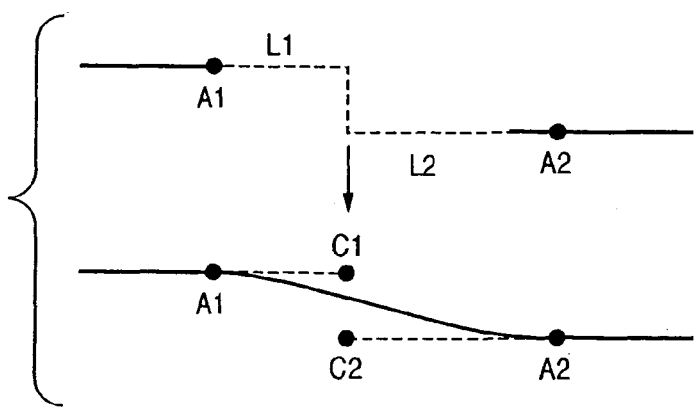
F I G. 16A
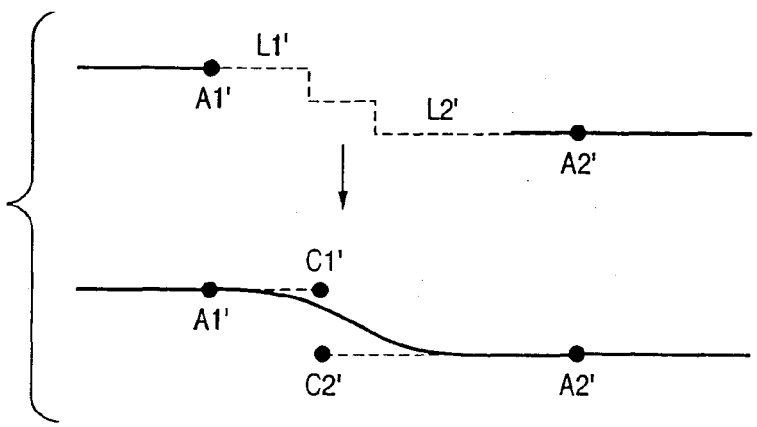
F I G. 16B
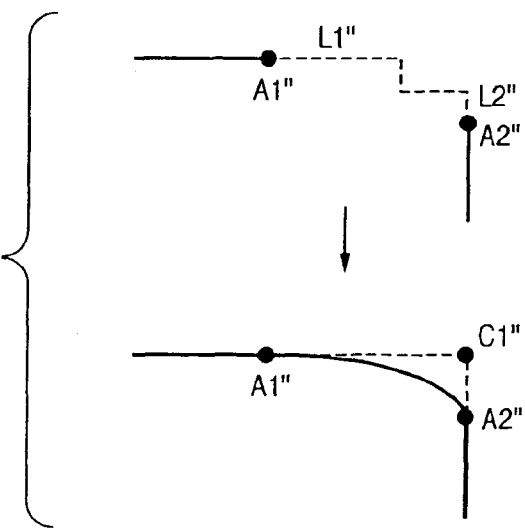
F I G. 16C

FIG. 41

| SEGMENT | START POINT | TERMINAL POINT | CHARACTERIZING POINT | CONTROL POINT | |
|---|---|---|---|---|---|
| | | | | C1 | C2 |
| 1 | p1(x1, y1) | pN1(x1, y1) | pL(x1, y1) | C11(x1, y1) | C12(x1, y1) |
| 2 | p2(x2, y2) | pN2(x2, y2) | pL(x2, y2) | C21(x1, y1) | C22(x2, y2) |
| 3 | p3(x3, y3) | pN3(x3, y3) | pL(x3, y3) | C31(x1, y1) | C32(x2, y2) |
| 4 | p4(x4, y4) | pN4(x4, y4) | pL(x4, y4) | C41(x1, y1) | C42(x2, y2) |
| ⋮ | ⋮ | ⋮ | ⋮ | ⋮ | ⋮ |

FUNCTION APPROXIMATION PROCESSING METHOD AND IMAGE PROCESSING METHOD

FIELD OF THE INVENTION

The present invention relates to a method for converting objects of a paper document read by an image reading device such as a scanner to outline data, and more particularly, to a method for approximating the outline of an object with straight lines or Bezier curves.

Further, the present invention is preferably applicable to an image processing apparatus and method for extracting binary image data from computerized data and performing outline processing on the extracted data.

BACKGROUND OF THE INVENTION

In recent years, with advance in information computerization, the spread of a system to generate computerized documents from paper documents and store or transmit the computerized documents is accelerated. Especially, to computerize a full-color document including a large amount of information and store/transmit the document, vector data, obtained by performing segmentation on a paper original to objects such as characters, tables and figures and generating electronic data in appropriate form to the respective objects, is desirable. The use of vector data reduces data amount, and further, increases recyclability.

Regarding the objects such as characters, tables and lines, the data amount of each object can be reduced by generating vector data (outline vector) by outline processing on the contour of the object thereby converting the object to a form represented with straight lines and curves. Further, a character can be converted to resolution-independent electronic data having high image quality, and a figure element such as a table or line can be converted to electronic data which can be easily handled in element-base editing.

In the above-described conversion to straight lines and curves, various methods have been studied. Most of the methods are first dividing point sequences representing a profile line into respective segments then converting the segments to curves or straight lines.

For example, a known method is once liner-approximating a profile line to represent the contour as a set of straight lines, then performing interpolation with B spline curves, Bezier curves and the like to replace the straight lines with smooth curves. As the linear approximation processing, segment dividing is generally known. Further, other methods are disclosed in Non-Patent Document 1: "Optimum Segment Approximation for Flat and Curved Surfaces" (SATO, the Institute of Electronics, Information and Communication Engineers Paper '82/9 Vol. J65-D No. 9) and Non-Patent Document 2: "Space-Efficient Outlines from Image Data via Vertex Minimization and Grid Constrains", Graphical Models and Image Processing Vol. 59 No. 2, pp. 73-88 (1997).

Further, as a method for dividing a profile line, a method of dividing a profile line represented with fine short vectors based on angle from point of interest (e.g., Patent Document 1: Japanese Patent Application Laid-Open No. 3-48375) is disclosed. Note that as the interpolation in the method, Non-Patent Document 3: Wolfgang BOHM: A Survey of Curve and Surface and Geometric Design 1, 1984, is introduced.

Further, regarding an angular change of a curve in tangential line direction in a point sequence, a simplified method of dividing a curve and generating a point sequence dividing the curve, obtaining the ratio of continuous three points in their positions in approximation processing, thereby determining two curves (e.g., Patent Document 2: Japanese Patent Application Laid-Open No. 8-153191) is proposed.

Further, as the interpolation method, a method using meromorphic quadratic Bezier curve (e.g., Patent Document 3: Japanese Patent Application Laid-Open No. 6-282658) is proposed. Note that the dividing method is not disclosed.

On the other hand, regarding curve approximation processing, a method for approximation on a divided point sequence using nonlinear programming (e.g., Patent Document 4: Japanese Patent Application Laid-Open No. 7-85110) is proposed.

Further, approximation with plural functions for an arbitrarily divided point sequence using DP (Dynamic Programming) (e.g., Non-Patent Document 4: "Paper Document Digitization Using Function Figure Representation" (MORI Kohichi, WADA Kohichi and TORAICHI Kazuo, Information Processing Society of Japan Report Vol. 99, No. 57, pp. 17-23) is proposed.

The generation of outline is realized by using the above conventional methods, however, various problems occur when adaptive and high-speed processing is performed on all the objects obtained from a raster image. For example, in a case where curve dividing is performed by using the linear approximation processing, as the linear approximation performs optimization of error between straight line and point sequence, the amount of processing is increased due to repetitive computation if high accuracy is required.

Similarly, in a case where approximation is performed on a point sequence by using a curve, as optimization is performed on the error between the curve and the point sequence, the amount of processing is increased. On the other hand, in the case of simplified dividing using an angle between point sequences without repetitive computation, since the method is too simple, various profile lines from small to large profile lines cannot be handled without difficulty. Further, to realize optimum dividing without influence of noise or the like, processing for obtaining a point sequence (short vector) forming a curve prior to dividing is important. However, this method is not disclosed.

Further, a method of obtaining a characterizing point between anchor points by the curve approximation processing and easily obtaining an optimum curve based on the ratio of distances among three points is proposed. However, as the characterizing point is used as a new anchor point, and two curves are obtained from three points including the two end anchor points, the numbers of curves and points are increased.

Further, in all the conventional methods, since outline is uniformly evaluated, the number of points is increased when the size of outline is increased, and when the size of outline is extremely reduced, the accuracy of approximation is degraded. Note that any countermeasure against these problems is not disclosed.

Accordingly, in the conventional methods, the first problem is that the approximation processing is heavy. The second problem is that in the simplified approximation processing to address the first problem, the accuracy cannot be ensured or the reduction of data amount cannot be realized.

Further, the third problem is that, in all the conventional methods, since outline is uniformly evaluated, the accuracy cannot be ensured for the size of object to be subjected to outline processing, and the processing cannot be performed in a flexible manner in correspondence with change of size.

SUMMARY OF THE INVENTION

The present invention has been made to address the above problems, and has its object to perform high-speed processing on an input object such as a character or figure, and generate outline having high image quality with a reduced number of points.

Further, the present invention has another object to convert image data to outline data by Bezier curve approximation capable of high-speed operation.

To attain the above objects, according to an aspect of the present invention, provided is a function approximation processing method comprising: an input step of inputting image data; a binarization step of binarizing the input image data; a contour extraction step of extracting contour from the binarized image data; a tangent point estimation step of estimating tangent points in horizontal and vertical directions from the extracted contour; and a function approximation step of approximating the contour between adjacent tangent points with a predetermined function.

Further, according to another aspect, provided is a function approximation processing method for allocating a cubic Bezier curve to a point sequence forming a curve, comprising: a curve dividing step of extracting a point sequence drawing an arc from the point sequence; and an approximation step of allocating a cubic Bezier curve to the extracted point sequence so as to obtain a straight line connecting two anchor points of the cubic Bezier curve and a straight line connecting two control points parallel to each other.

Further, according to another aspect, provided is a function approximation processing method comprising: an input step of inputting image data; a binarization step of binarizing the input image data; a contour extraction step of extracting contour from the binarized image data; a step of detecting an area surrounded by a closed curve based on the extracted contour and obtaining the size of the area; a step of, upon function approximation of a profile line by the area, defining a parameter for the function approximation in accordance with the size of the area; and a step of performing function approximation on contour pixels in the area in accordance with the defined parameter.

Further, according to another aspect, provided is an image processing method comprising: a step of segmenting raster image data then extracting a character area, and cutting out characters from the character area by each character; an outline conversion step of converting the cut character to outline data having straight lines and curves; and a step of outputting the result of conversion as data in the form of predetermined shape modeling language.

Further, according to another aspect, provided is an image processing method for converting binary image data to outline data using Bezier curves, comprising: a curve dividing step of dividing a contour point sequence of a binary image extracted from input computerized data into contour segments each can be approximated with a Bezier curve and storing position information of start point and terminal point of each divided contour segment into storage means; a characterizing point determination step of determining at least one point of the contour point sequence belonging to each divided contour segment as a characterizing point satisfying a first distance condition to a first line segment connecting the start point and the terminal point of the divided contour segment, and storing position information of the characterizing point into the storage means; a control point determination step of comparing position information on a second line segment parallel to the first line segment satisfying a second distance condition to the first line segment, with position information on tangents to the respective start point and terminal point of the divided contour segment, determining intersection points where both position information correspond with each other as control points, and storing position information of the determined control points into the storage means; and an approximation computation step of reading the position information of the start point and terminal point of the divided contour segment and the position information of the characterizing point and the control points from the storage means, and approximating the divided contour segment with the Bezier curve.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a table showing block information for respective blocks separated by segmentation processing 303 in FIG. 3 and input file information;

FIG. 6 is a flowchart showing processing in outline generation units 306 and 307 in FIG. 3;

FIGS. 11A to 11C show an example of noise to be filtered out;

FIG. 12 shows an example of noise-like rough contour data;

FIGS. 15A and 15B show an example of extraction of anchor point;

FIGS. 16A to 16C show an example of primary approximation processing;

FIG. 41 is a table showing position information of start point, terminal point, characterizing point and control points of divided segments stored in a storage unit.

DETAILED DESCRIPTION OF THE PREFERRED EMBODIMENTS

Hereinbelow, preferred embodiments of the present invention will now be described in detail in accordance with the accompanying drawings.

First Embodiment

Figure 1:
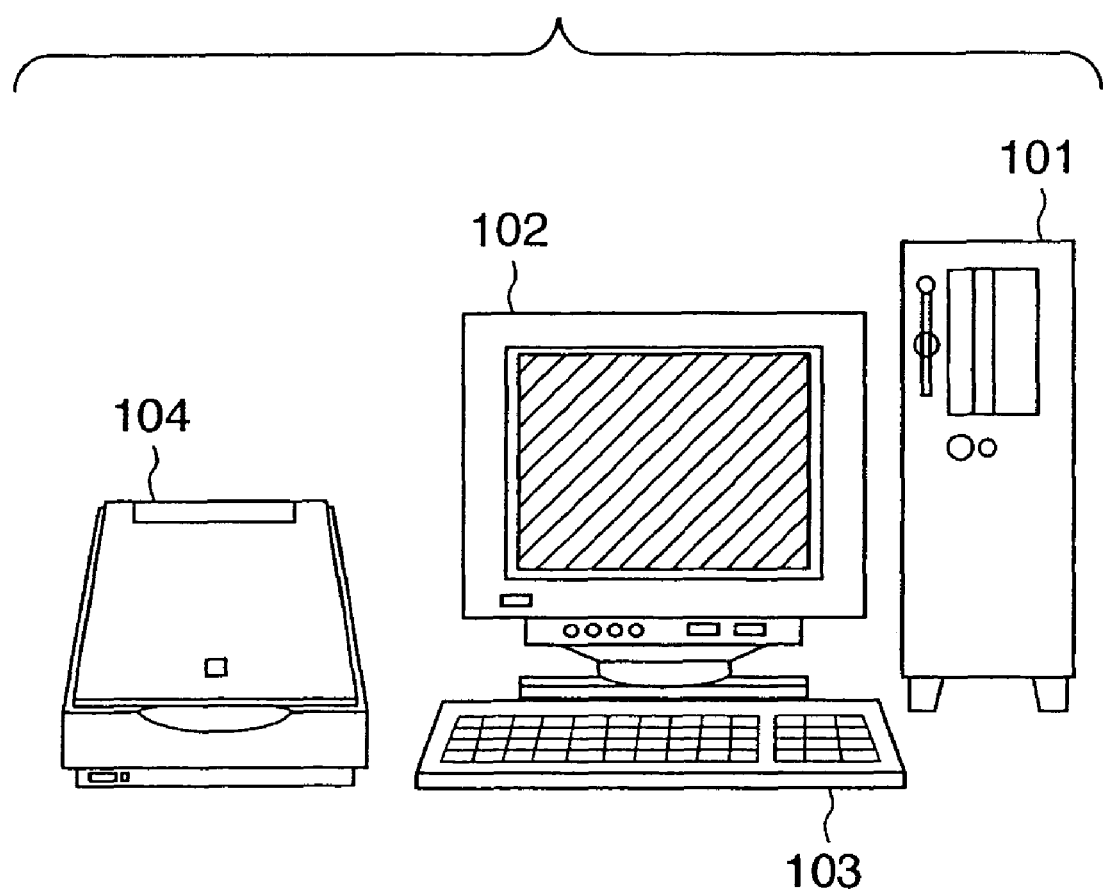
FIG. 1 is an overview of a document processing apparatus according to a first embodiment of the present invention.

FIG. 1 is an overview of a document processing apparatus according to a first embodiment of the present invention. In FIG. 1, reference numeral 101 denotes a computer which performs document computerization processing program including programs to realize processing to be described with reference to flowcharts later. Further, the computer 101 is connected to a display unit 102 to display status and image for a user and an input unit 103 having pointing devices such as keyboard and mouse for reception of the user's operation. As the display unit 102, a CRT, an LCD or the like is employed. Numeral 104 denotes a scanner which optically reads and computerizes a document image and sends obtained image data to the computer 101. As the scanner 104, a color scanner is employed.

Figure 2:
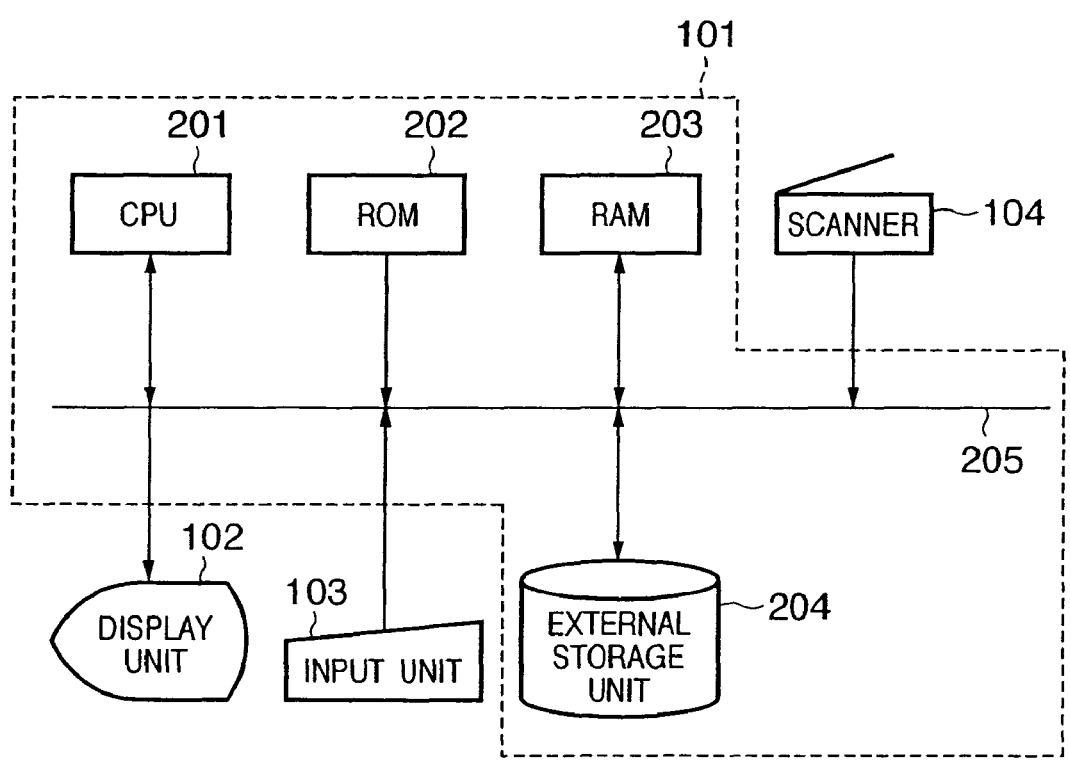
FIG. 2 is a block diagram showing the construction of the document processing apparatus according to the first embodiment.

FIG. 2 is a block diagram showing the construction of the document processing apparatus according to the first embodiment. In FIG. 2, numeral 201 denotes a CPU which executes control programs stored in a ROM or RAM to be described later, thereby realizes various functions including computerization processing to be described later; 202, the ROM which holds various control programs executed by the CPU 201 and control data; 203, the RAM having an area where the various control programs executed by the CPU 201 are loaded and a work area necessary for execution of the various processings by the CPU 201.

Numeral 204 denotes an external storage unit which holds a control program to realize processing according to the first embodiment (details will be described later) by the CPU 101, document image data obtained by reading with the scanner 104, and the like; and 205, a computer bus connecting the above-described respective constituent elements.

Figure 3:
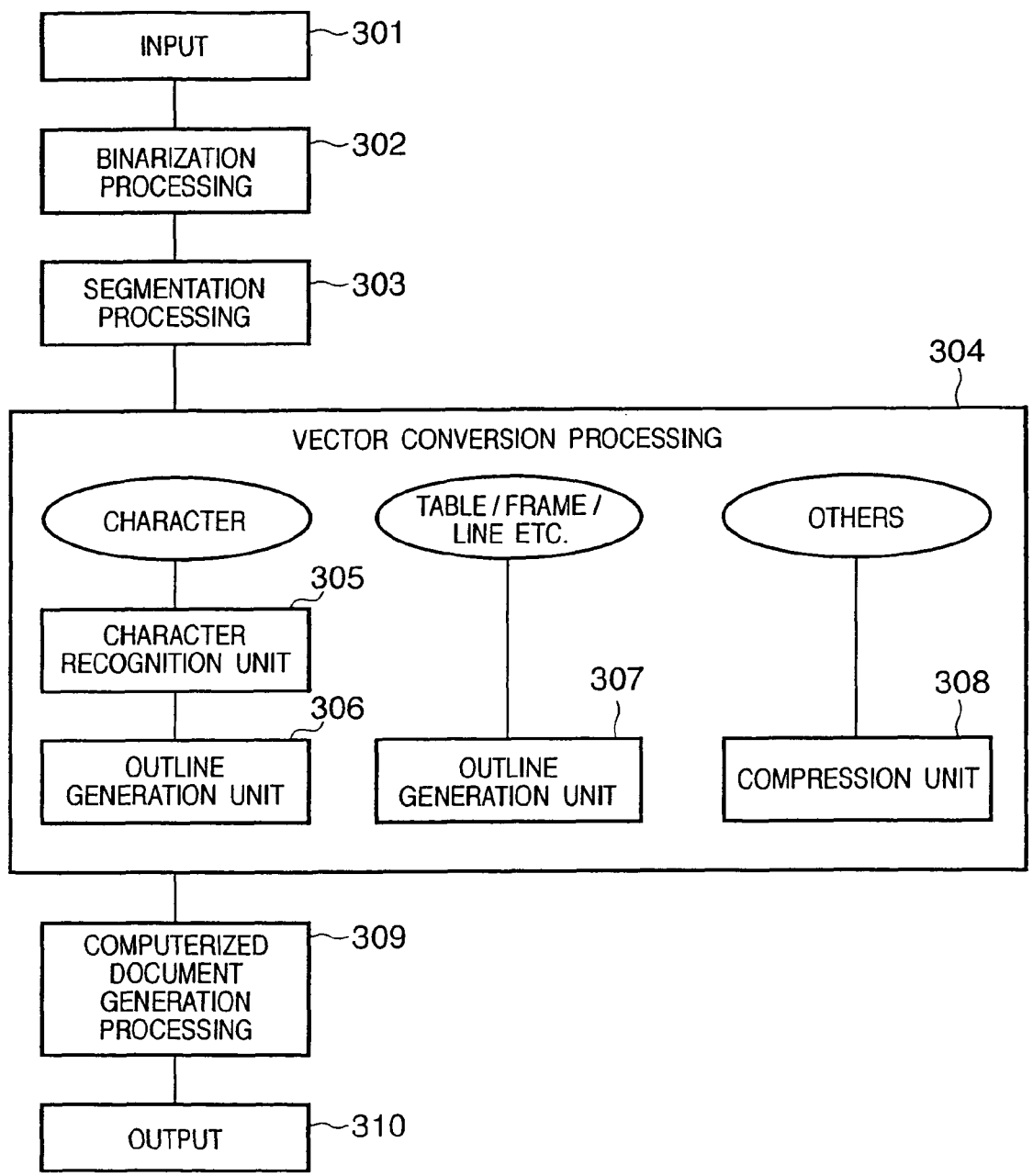
FIG. 3 is a block diagram showing the outline of document computerization processing in the document processing apparatus.

FIG. 3 is a block diagram showing the outline of the document computerization processing in the document processing apparatus. First, an input unit 301 reads a color document as the subject of computerization using the scanner 104, and stores the document as image data in the external storage unit 204. Then, binarization processing 302 performs binarization processing on the document image data stored in the external storage unit 204, for segmentation processing and outline generation processing in the subsequent stage. Then segmentation processing 303 extracts elements such as character, figure, table, frame and line from the binary image obtained by the binarization processing 302, thereby divides the document image data into respective areas.

Next, in vector processing 304, a character unit performs character recognition by a character recognition unit 305, and converts the data to outline vector data by an outline generation unit 306. Further, a unit for table, frame, line and the like generates outline data by an outline generation unit 307. Further, the image data converted by the outline generation units 306 and 307 are resolution-independent vector data, where profile lines of respective objects are represented with smooth curves. The vector data has high image quality and can be easily edited.

On the other hand, other elements such as photograph and background are compressed and held in correspondence with respective formats. For example, a background image is subjected to JPEG compression by a compression unit 308.

Next, computerized document generation processing 309 generates a computerized document from respectively-converted image information using the character recognition data and table structure data, based on attributes of divided elements. Then an output unit 310 stores the generated computerized document in the external storage unit 204.

Note that the form of output by the output unit 310 is not limited to the storage in the external storage unit 204. The document may be displayed on the display unit 102, outputted to other device on a network via a network interface (not shown), or transmitted to a printer (not shown).

[Binarization Processing]

The binarization processing 302 extracts luminance information from input document image data, and generates a histogram of luminance values. Plural threshold values are set from the histogram, and an optimum threshold value is derived by analyzing black-pixel connection on binary image binarized with the respective threshold values, and a binary image based on the optimum threshold value is obtained.

[Segmentation Processing]

Figure 4:
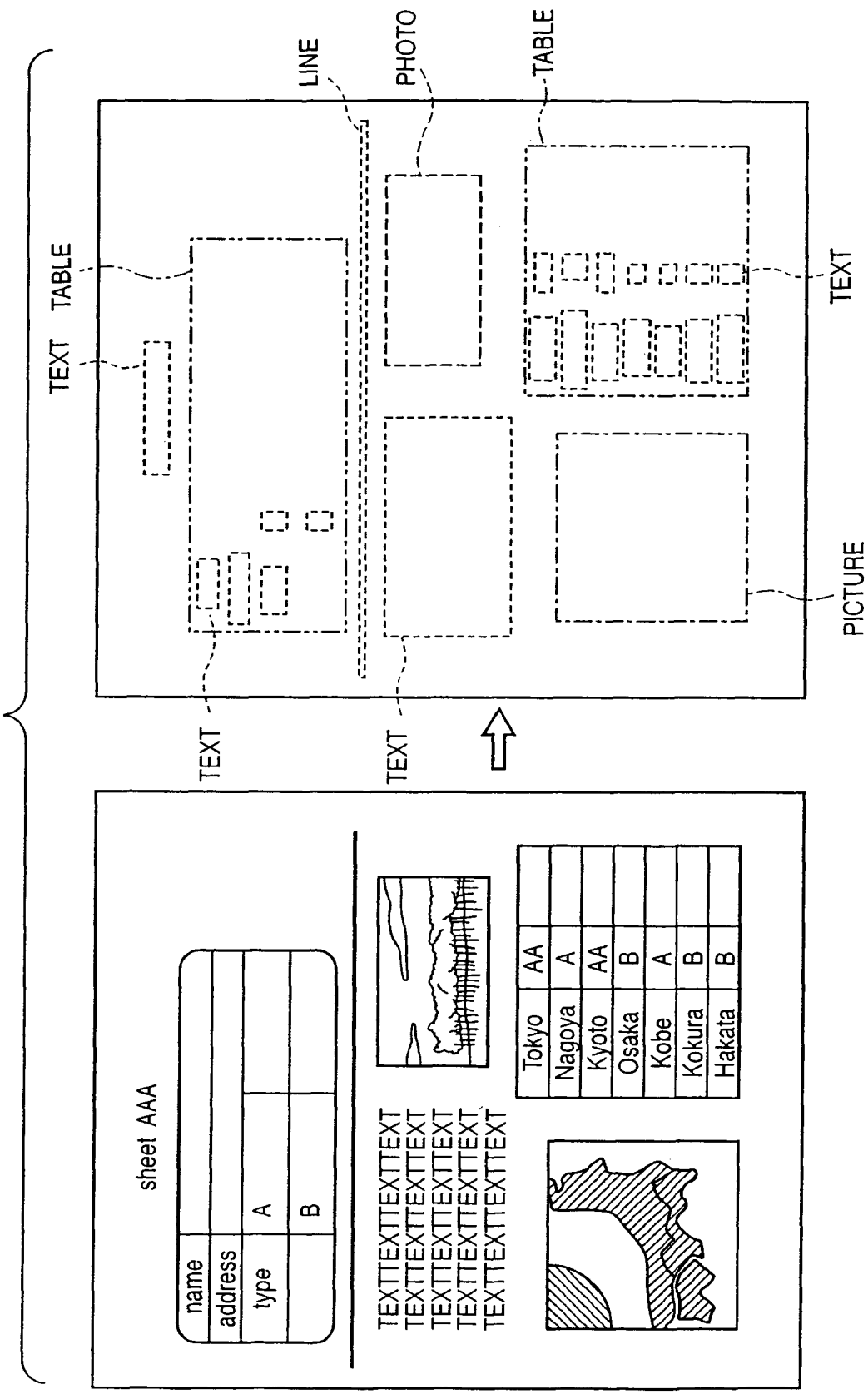
FIG. 4 is an explanatory view of segmentation processing.

The segmentation processing 303 recognizes read 1-page image data, as shown in the left side of FIG. 4, as object blocks, determines attributes, character/figure/photograph/line/table etc. of the objects, and divides the image data to areas having different attributes (TEXT/PICTURE/PHOTO/LINE/TABLE), as shown in the right side of FIG. 4.

The segmentation processing 303 traces a profile line of black pixels in a binary image obtained by the binarization processing 302 to extract pixel block surrounded by the black pixel contour. Further, regarding a black pixel block having a large area, the profile line tracing is also performed on white pixels inside the black pixel block, to extract a white pixel block. Further, a black pixel block is recursively extracted from the inside of a white pixel block having an area of predetermined or larger size.

The black pixel blocks obtained as above are classified by size and shape, to areas having different attributes. For example, a block having an approximately "1" aspect ratio and having a size within a predetermined range, is determined as a character pixel block. Further, a portion where adjacent characters are neatly arrayed as a group is determined as a character area. A flat pixel block is determined as a line area. A range of black pixel block having a size equal to or larger than a predetermined size, and including neatly arrayed rectangular white pixel blocks, is determined as a table area. An area where indefinite-shaped pixel blocks are scattered is determined as a photo area. Other pixel blocks having arbitrary shapes are determined as figure areas.

FIG. 5 is a table showing block information for respective blocks separated by the segmentation processing 303 and input file information. As shown in FIG. 5, the block information includes block attribute, coordinates (X, Y), width (W), height (H) and OCR information. Attribute 1 indicates a character; attribute 2, a figure; attribute 3, a table; attribute 4, a line; and attribute 5, a photograph. The input file information has a total number of blocks N (in FIG. 5, "6" (block 1 to block 6)).

Note that in a case where a more sharp binary image is to be obtained regarding each block, the above-described binarization processing may be performed by block.

[Character Recognition]

The character recognition unit 305 performs recognition on character-base image using a kind of pattern matching method, to obtain a corresponding character code. The recognition processing is comparing an observational characterizing vector, which is several ten-dimensional sequences of numerical values converted from a character image, with dictionary characterizing vectors previously-obtained by character type, and determining a nearest character type as a recognition result. The feature vector is extracted by various well-known methods. For example, a character is divided into meshes, character lines in respective meshes are counted as line elements by direction, thereby a mesh number dimensional vector is generated.

Upon execution of character recognition on a character area extracted by the segmentation processing 303, first, horizontal writing/vertical writing determination is performed on the area, then lines are cut out in a corresponding direction, then characters are cut out as character images. As the determination of horizontal writing/vertical writing, horizontal/vertical projections to the pixel values in the area are obtained, and if the dispersion of the horizontal projection is large, it is determined that the writing style of the area is horizontal writing, while if the dispersion of the vertical projection is large, it is determined that the writing style of the area is vertical writing. Further, the analysis of character string and characters is cutting the lines utilizing e.g. the horizontal projection in the case of horizontal writing, and further, cutting the characters utilizing the vertical projection of the cut out line. Regarding a character area of vertical writing, the same processing is made in inverted directions. Note that at this time, the size of character can be detected.

[Outline Generation Unit]

The outline generation units 306 and 307 convert characters, tables, frames and lines obtained by the segmentation processing to outline vector data representing contour shape with straight lines and smooth curves. The conversion method is employed for high-speed processing while suppressing degradation of image quality upon generation of outline vector data from an object basic pattern. This conversion will be described in detail later.

FIG. 6 is a flowchart showing the processing in the outline generation units 306 and 307. The input in this processing is a binary image in, e.g., a character (TEXT) area as shown in FIG. 4, extracted by the segmentation processing 303. Further, in the case of character, the input may be an image cut out by character in the character recognition unit 305.

First, at step S601, binary raster image data is converted to outline data having horizontal vectors and vertical vectors (hereinafter, referred to as "rough contour data"). Note that rough contour data extracted from input raster image data is not limited to one data but in many cases, plural rough contour data are extracted.

Next, at step S602, each extracted rough contour data is converted to outline vector data represented with straight lines and curves.

Figure 7A:
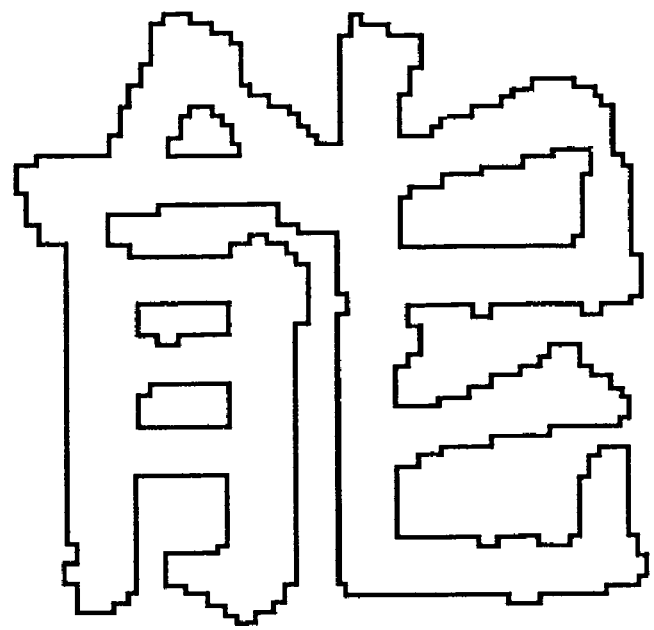
FIGS. 7A and 7B show examples of rough contour data and outline vector data.
Figure 7B:
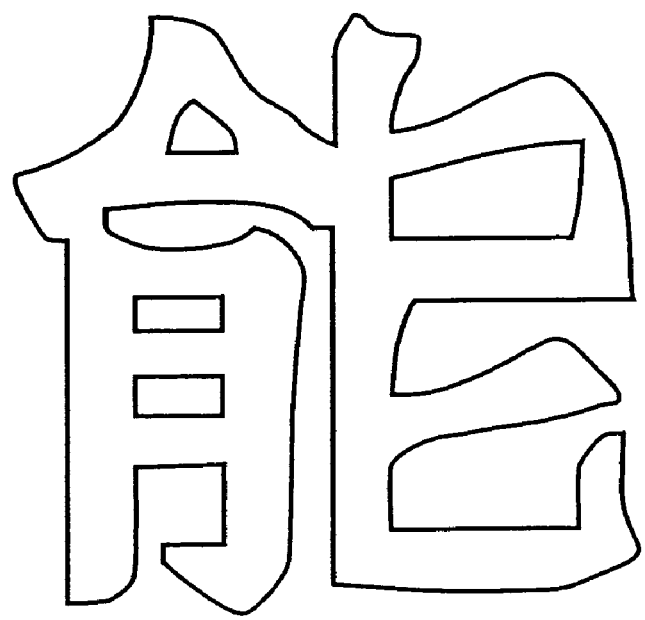

FIGS. 7A and 7B show examples of rough contour data and outline vector data. FIG. 7A shows rough contour data, and FIG. 7B, outline vector data.

Figure 8:
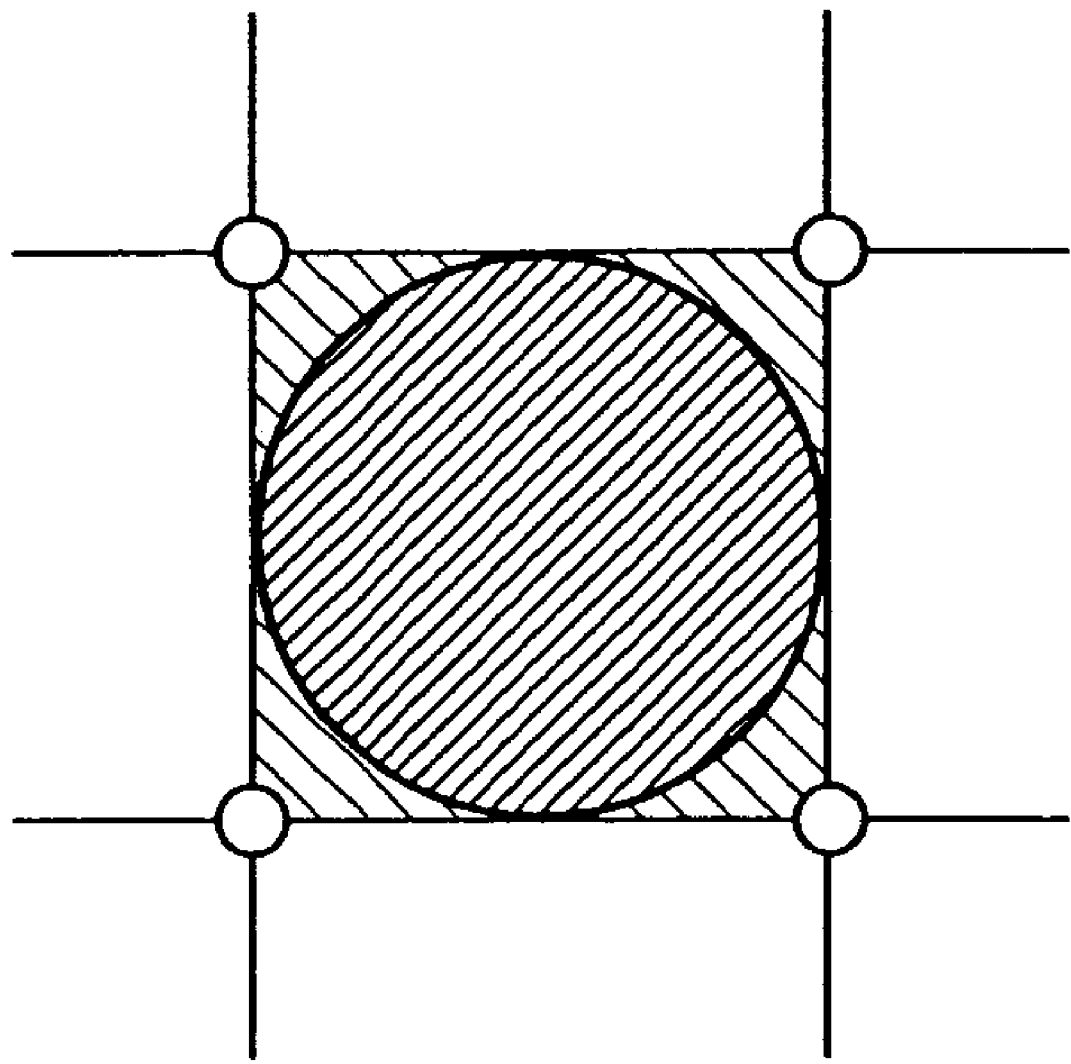
FIG. 8 is an example of one pixel of raster image data.

Hereinbelow, the respective steps in the flowchart of FIG. 6 will be described in detail with reference to FIGS. 8, 9A and 9B.

At step S601, binary raster image data is converted to rough contour data. FIG. 8 shows one pixel of the raster image data handled in this processing. As shown in FIG. 8, one pixel in the raster image data has 4 vertices, and the pixel is handled as a square element formed with vertical and horizontal vectors. When the outline of raster image data, as a set of pixels each handled as a square element having 4 vertices, has been extracted, rough contour data formed with horizontal vectors and vertical vectors is extracted.

As the extraction of rough contour data, various methods are proposed. Especially, the use of rough contour extraction method disclosed in Japanese Patent Application Laid-Open No. 5-108823 enables high-speed and efficient extraction of rough contour data from a raster image.

Figure 9A:
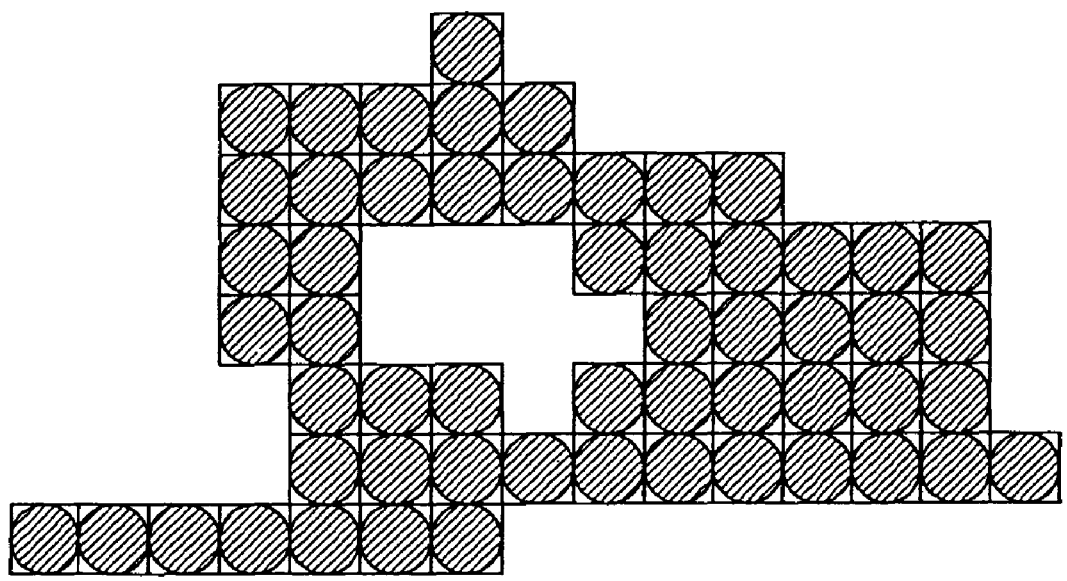
FIGS. 9A and 9B show an example of the structure of rough contour data.
Figure 9B:
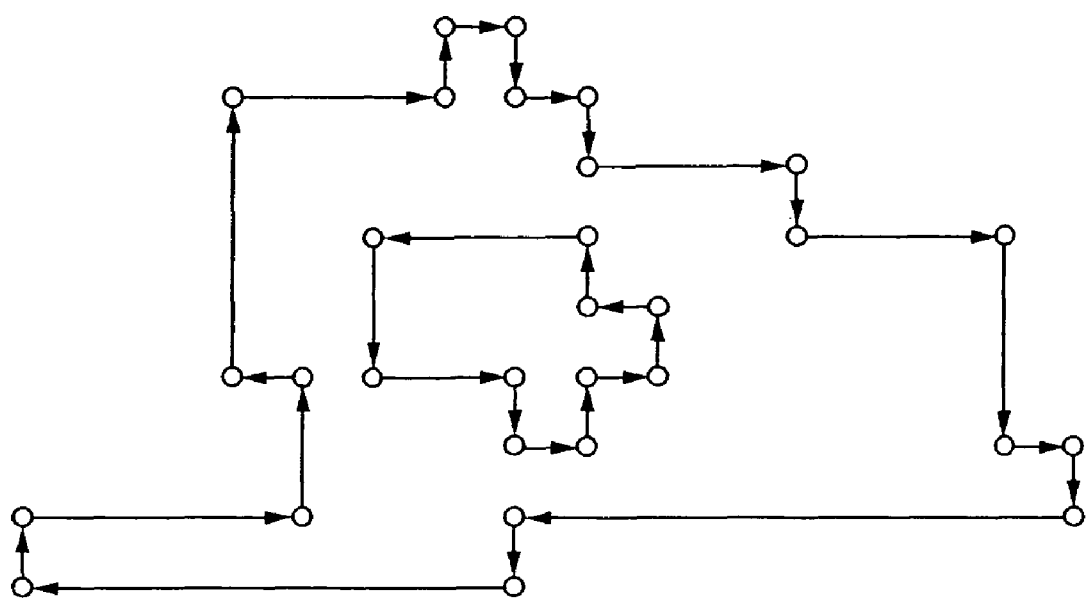

The rough contour data extracted from the raster image data as shown in FIG. 9A is as shown in FIG. 9B where horizontal vectors and vertical vectors are alternately arranged. In this rough contour data extraction, such contour data having alternate horizontal vectors and vertical vectors is extracted, and the process proceeds to step S602.

At step S602, the rough contour data obtained at step S601 is converted to outline vector data formed with straight lines and curves.

Figure 10:
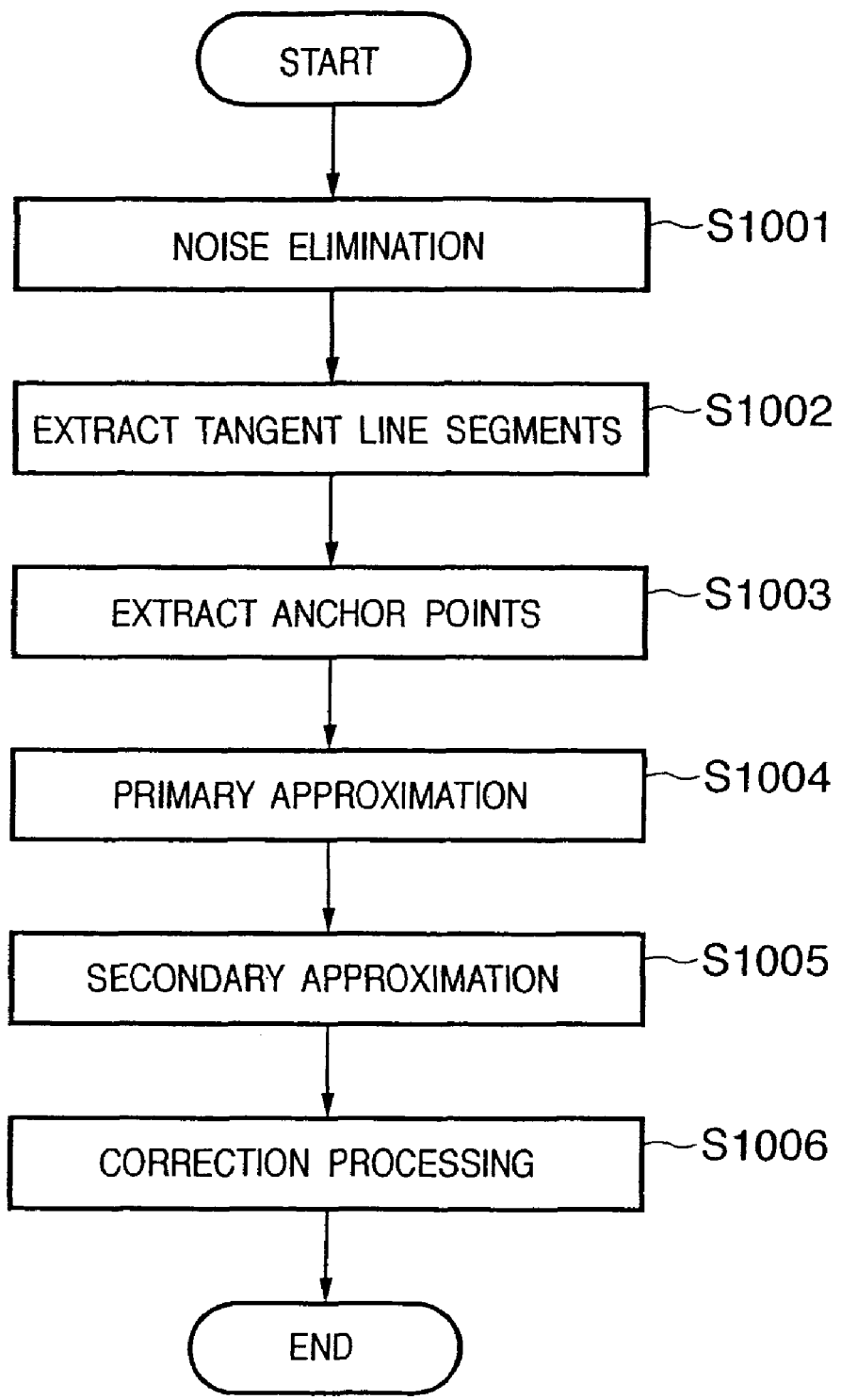
FIG. 10 is a flowchart showing processing of converting rough contour data to outline vector data according to the first embodiment.

FIG. 10 is a flowchart showing the processing of converting rough contour data to outline vector data according to the first embodiment. First, noise elimination is performed on the rough contour data (step S1001), then main tangent line segments are extracted from line segments on the noise-eliminated rough contour data, and sub tangent line segments are extracted (step S1002). Note that the main tangent line segments and sub tangent line segments will be described later.

Next, anchor points are extracted (step S1003) from the main tangent line segments and sub tangent line segments extracted at step S1002. A group having several line segments between the extracted anchor points is replaced with a quadratic or cubic Bezier curve (step S1004). Next, Bezier curve approximation is performed on the remaining line segments, and the segments are replaced with cubic or quadratic Bezier curves (step S1005). Finally, correction processing is performed on the outline vector data formed with straight lines and curves (step S1006).

Hereinbelow, the respective steps in the flowchart of FIG. 10 will be described in detail with reference to FIGS. 11 to 20.

[Noise Elimination]

First, in the noise elimination (step S1001), noise elimination is performed on the rough contour data. FIGS. 11A to 11C show examples of eliminated noise. Note that in FIG. 11C, "1" indicates the size of one pixel in the raster image. The filter-out is performed for the purpose of eliminating one-pixel size unevenness. In the noise elimination, dotted-line noise shown in FIGS. 11A and 11B and corner-omitted noise shown in FIG. 11C are filtered out. However, as shown in FIG. 12, there is noise-like rough contour data. Especially, as small to large sized characters are handled, if all the noise-like rough contour data having the shape shown in FIG. 12 are eliminated, the image quality is degraded.

Accordingly, noise analysis is required. For example, the noise shown in FIGS. 11A to 11C are eliminated if the following conditions (a) to (c) are satisfied.

(a) Regarding one convex noise, the following expression holds.

$$|\vec{v}_1 + \vec{v}_3| \geq \alpha_1 * |\vec{v}_2| \quad \text{[Expression 1]}$$

(b) Plural convex noises are adjacent to each other.

(c) All the following expressions hold.

$$|\vec{v}''_1| \geq \theta_1, |\vec{v}''_2| \leq \theta_2, |\vec{v}''_3| \leq \theta_3 \quad \text{[Expression 2]}$$

Note that as the elimination based on the condition (b), the following two noises are compared with each other, and a smaller one is filtered out as an upper side of convex noise.

$$|\vec{v}'_1 + \vec{v}'_3 + \ldots + \vec{v}'_n| |\vec{v}'_2 + \vec{v}'_4 + \ldots + \vec{v}'_{n-1}| \quad \text{[Expression 3]}$$

The respective parameters $a_1$, $\theta_1$, $\theta_2$ and $\theta_3$ for noise determination may be constant values. However, as it is difficult to uniformly evaluate all the objects in small to large sized objects, the parameters may be changed in correspondence with object size of rough contour data. As the object size information, i.e., the character size is already extracted by the character recognition unit 305 and the outline size is already extracted by the segmentation processing 303, the threshold values $\theta_1$, $\theta_2$ and $\theta_3$ can be easily derived.

The noise elimination is performed as described above. The noise elimination may be performed on binary raster image data prior to the rough contour extraction. In the case of noise-eliminated raster image data, the noise elimination at step S1001 may be omitted. However, in the case of noise elimination on raster image data, all the one image must be processed, and further, if noise elimination is performed under the above-described conditions, the processing becomes very heavy. On the other hand, in rough contour data, as the number of data is small, the filter-out processing can be efficiently performed.

[Tangent Line Segment Extraction]

Next, at step S1002, tangent line segments of the object are extracted from noise-eliminated rough contour data. The tangent line segment is a line segment which is a tangent element of object shape among line segments of rough contour data.

Figure 13A:
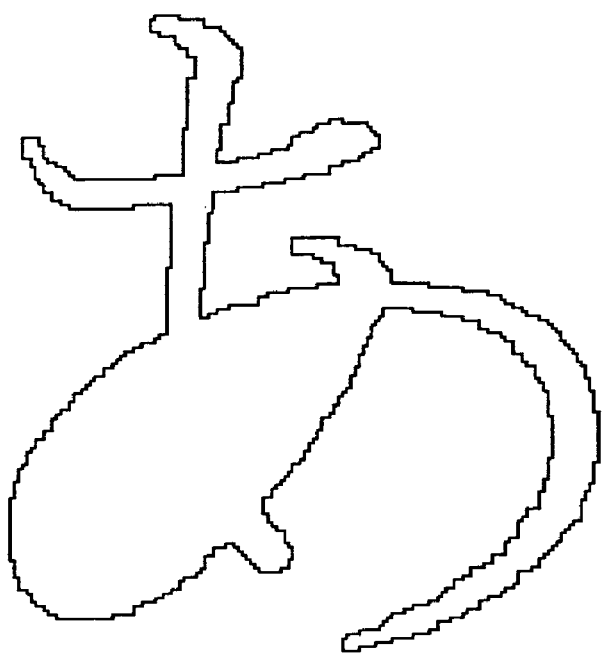
FIGS. 13A and 13B are explanatory views showing extraction of tangent line segments from rough contour data.
Figure 13B:
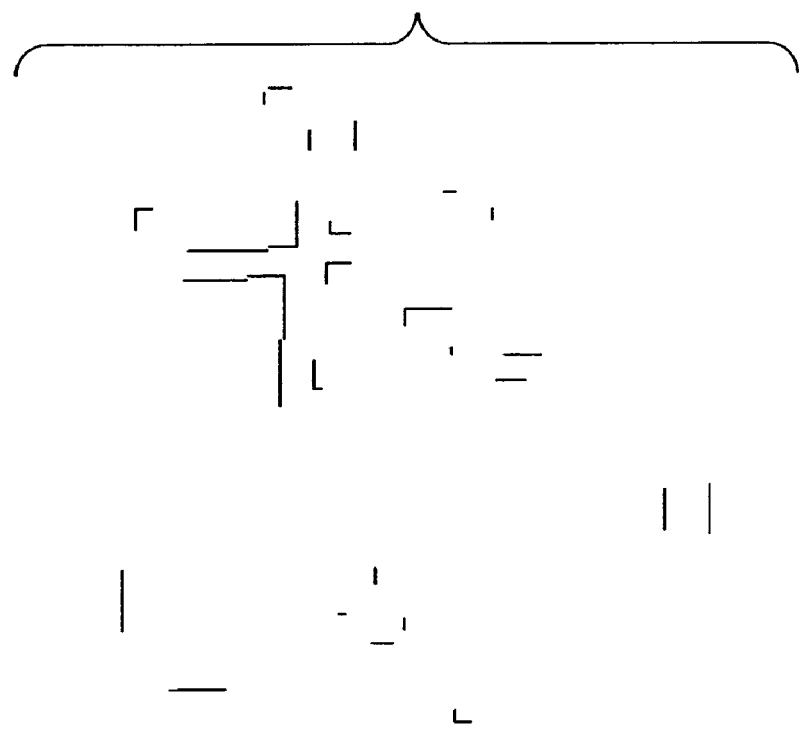

FIGS. 13A and 13B are explanatory views showing extraction of tangent line segments from rough contour data. FIG. 13A shows original rough contour data, and bold lines in FIG. 13B are tangent line segments extracted from the rough contour data in FIG. 13A. Note that tangent line segments are extracted if the following conditions (1) to (4) are satisfied.

[Expression 4]

(1) A line segment of vector $$\vec{\alpha}_2$$

which satisfies $$\vec{\alpha}_1 * \vec{\alpha}_3 < 0$$

(2) A line segment s1 which is adjacent to a main tangent line segment and which has a length L1 satisfying $L1 \geq \theta_4$ (3) A line segment s2 which has a length L2 satisfying $L2 \geq \theta_5$ (4) Line segments s3 and s4 which satisfy $(L2 \geq \theta_5 \&\& L2 \geq \theta_5) || (L2 \geq \theta_5 \&\& L2 \geq \theta_5)$ Note that the parameters $\theta_1$ to $\theta_5$ used in the conditions may be resolution-dependent constant values, however, the values may be adaptively changed in accordance with character size extracted by the character recognition unit 305, area size detected by the segmentation processing 303 or object size such as outline size detected at step S601.

Further, one or plural conditions may be selected from the conditions (1) to (4) in correspondence with object size.

By changing the conditions in accordance with object size, optimum approximation processing in correspondence with character size and contour size can be performed.

Figure 14A:
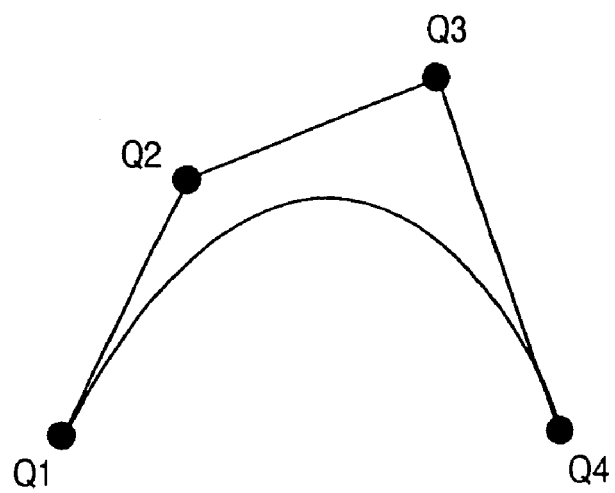
FIGS. 14A to 14C show a cubic Bezier curve, a quadratic Bezier curve and a straight line used upon conversion of rough contour data to outline data.
Figure 14B:
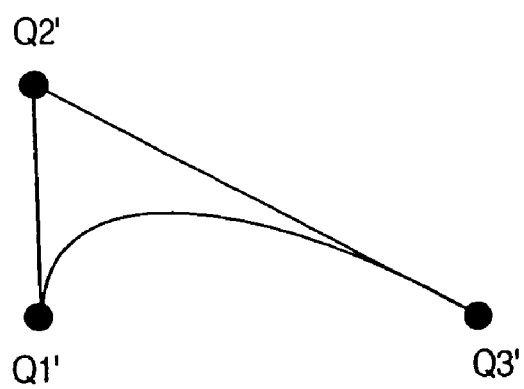
Figure 14C:
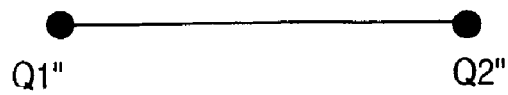

Then, at steps S1004 to S1006, the rough contour data is converted to outline data represented with straight lines and curves. More particularly, as the curves, a cubic Bezier curve as shown in FIG. 14A and a quadratic Bezier curve as shown in FIG. 14B are used. FIG. 14C shows a straight line.

Note that the cubic Bezier curve shown in FIG. 14A and the quadratic Bezier curve shown in FIG. 14B are represented with the following expressions 1 and 2.

$$B(t)=(1-t)3 \cdot Q1+3(1-t)2 \cdot t \cdot Q2+3(1-t) \cdot t2 \cdot Q3+t3 \cdot Q4 \quad \text{Expression 1}$$

$$B(t)=(1-t)2 \cdot Q1'+2(1-t) \cdot t \cdot Q2'+t2 \cdot Q3' \quad \text{Expression 2}$$

In FIGS. 14A to 14C, points Q1, Q4, Q1', Q3', Q1" and Q2" are anchor points, and points Q2, Q3 and Q2' controlling the curves are referred to as control points. A straight line connecting a control point and an anchor point, e.g., a straight line Q1Q2 is in contact with the curve in the anchor point Q1.

Further, if no control point exists between anchor points, the line connecting the anchor points is a straight line as shown in FIG. 14C.

[Anchor Point Extraction]

At step S1003, new points are extracted as anchor points on the tangent line segments extracted at step S1002. The anchor points are respectively extracted regarding 2 ends of a tangent line segment. Accordingly, two anchor points are extracted regarding one tangent line segment, however, if two anchor points correspond with each other, only one anchor point is extracted. When two anchor points are extracted, a portion between the anchor points automatically becomes a straight line on the object.

Next, an example of anchor point extraction regarding one end point on a tangent line segment will be described. FIGS. 15A and 15B show an example of anchor point extraction. In FIGS. 15A and 15B, a vector V2 is a vector of tangent line segment. The anchor point extraction is performed on an end point on the vector V1 side.

First, if the vector V1 adjacent to the vector V2 is a tangent line segment, the end point is an anchor point. If the adjacent line segment is not a tangent line segment, a point away from the end point on the vector V2 by "a|V1|" is an anchor point as shown in FIG. 15A.

As shown in FIG. 15B, if |V2|/2<a|V1| holds, the central point of the vector V2 is an anchor point.

[Primary Approximation and Secondary Approximation]

Next, at steps S1004 and S1005, the line segments among the anchor points extracted at step S1003 are subjected to curve approximation with Bezier functions. Note that the curve approximation processing is not performed on the line segments to which straight line attribute was automatically allocated.

More particularly, the curve approximation processing has two types of approximation processing. First, primary approximation processing of replacing a fine portion on an object where several (<n1) line segments exist between anchor points with one curve (step S1004) is performed, and secondary approximation processing of approximating a portion including more line segments with one or more curves (step S1005) is performed. In the former processing, one curve is allocated to a combination of line segments, however, as the approximation can be performed by using the latter processing, the portion between the anchor points may be subjected to curve approximation processing using only the latter processing. However, the former processing is superior to the latter processing in point of performance. Further, as the approximation can be performed with a small number of points on a combination of a few line segments, it is desirable to employ the primary approximation for such fine portion.

First, an example of the primary approximation processing (step S1004) will be described with reference to FIGS. 16A to 16C. Note that points A1 and A2 in FIG. 16A are anchor points extracted at step S1003. The curve is approximated by providing control points C1 and C2 for line segments L0, L1 and L2 among the anchor points.

Note that the values of the control points C1 and C2 are obtained from the relation between the control points and the line segments L0 and L2. Further, in a case where several line segments exit between anchor points and tangent line segments to both end anchor points are orthogonal to each other, the portion is replaced with a quadratic Bezier curve. Further, in a case where several line segments are sufficiently large to the object size, the portion may be replaced with a cubic Bezier curve in a more precise manner.

Note that as the primary approximation processing is replacement in accordance with pattern, and the anchor point extraction at step S1003 is also processing in accordance with pattern, these two steps may be performed at once.

Figure 17:
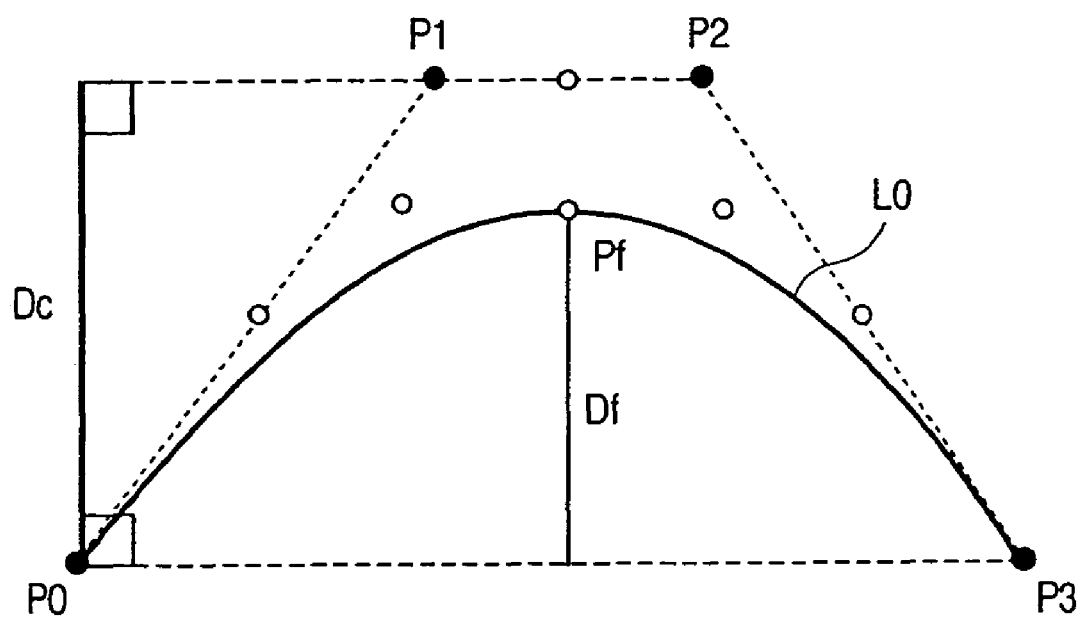
FIG. 17 shows a curve used in secondary approximation processing.

Next, the secondary approximation processing (step S1005) will be described. First, a curve used in the secondary approximation processing is shown in FIG. 17. In FIG. 17, the curve is a cubic Bezier curve. A straight line connecting anchor points P0 and P3 and a straight line connecting control points P1 and P2 are parallel to each other. With such parallel limitation, assuming that the distance between a straight line P0P3 and a point Pf on the cubic Bezier curve L0 farthest from the straight line P0P3 is Df, and the distance between the straight line P0P3 and the control points P1 and P2 is Dc, the following relation is established.

$$Dc=4/3Df \quad \text{Expression 3}$$

Note that the approximation processing can be easily performed by using a Bezier curve with parallel limitation.

Hereinbelow, a summary of the approximation processing will be described. In the secondary approximation processing, first, dividing to segment curves is performed, and the curve approximation processing is performed on the respective segment curves. The segment curve means a curve describing an arc, i.e., as shown in FIG. 17, a cubic curve where 2 control points to a straight line connecting 2 anchor points are in the same direction.

Figure 18A:
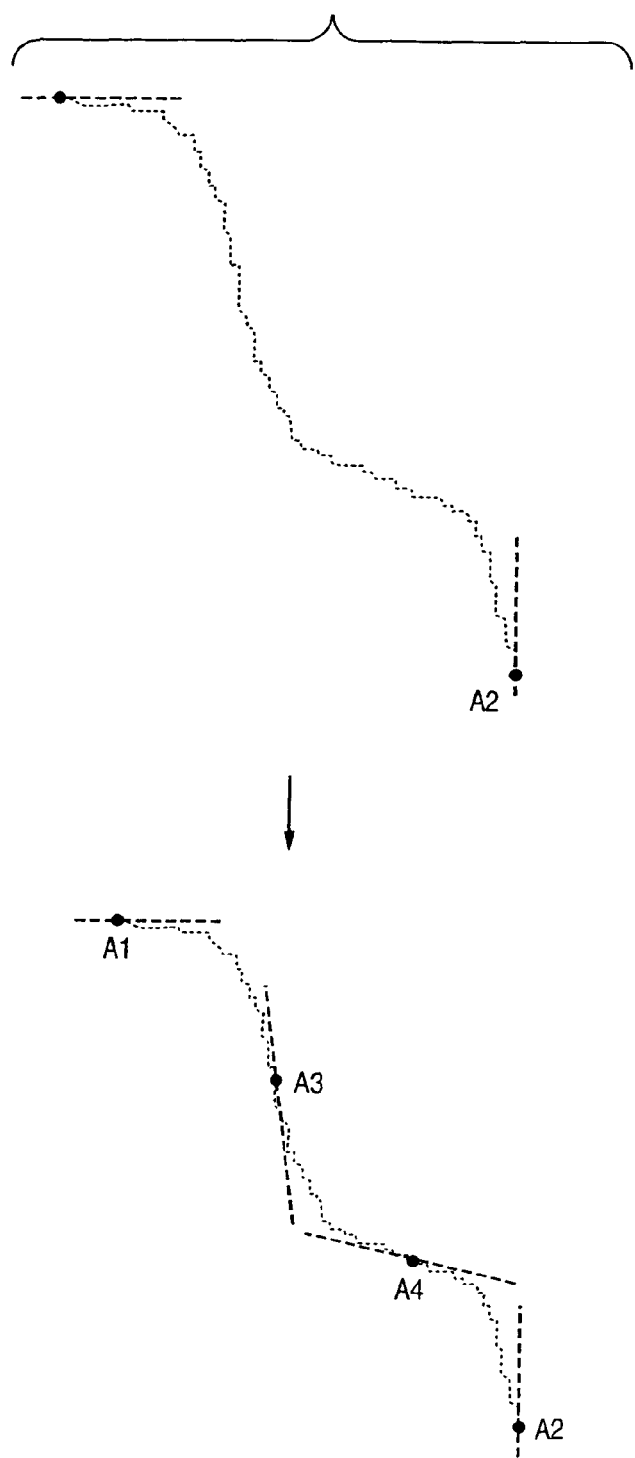
FIGS. 18A and 18B show examples of dividing to segment curves and extraction of direction vector in a pattern matching manner.
Figure 18B:
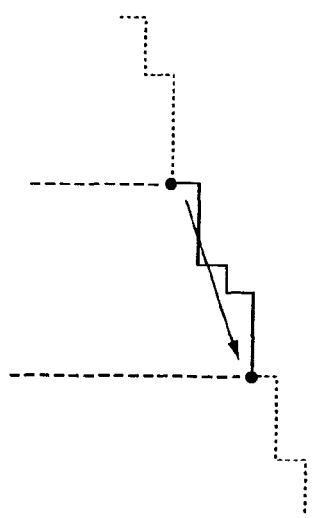

In the dividing to segment curves, as shown in FIG. 18B, first, a directional vector is extracted in a pattern matching-like manner by combination of plural line segments. Then the change of the obtained directional vector is traced, and a point where the positive/negative sign of the directional vector changes is a dividing point.

Note that the above-described dividing point is the anchor point in the curve approximation, and the directional vector is the tangent vector in the anchor point.

Further, FIG. 18A shows an example of dividing to segment curves.

Figure 19:
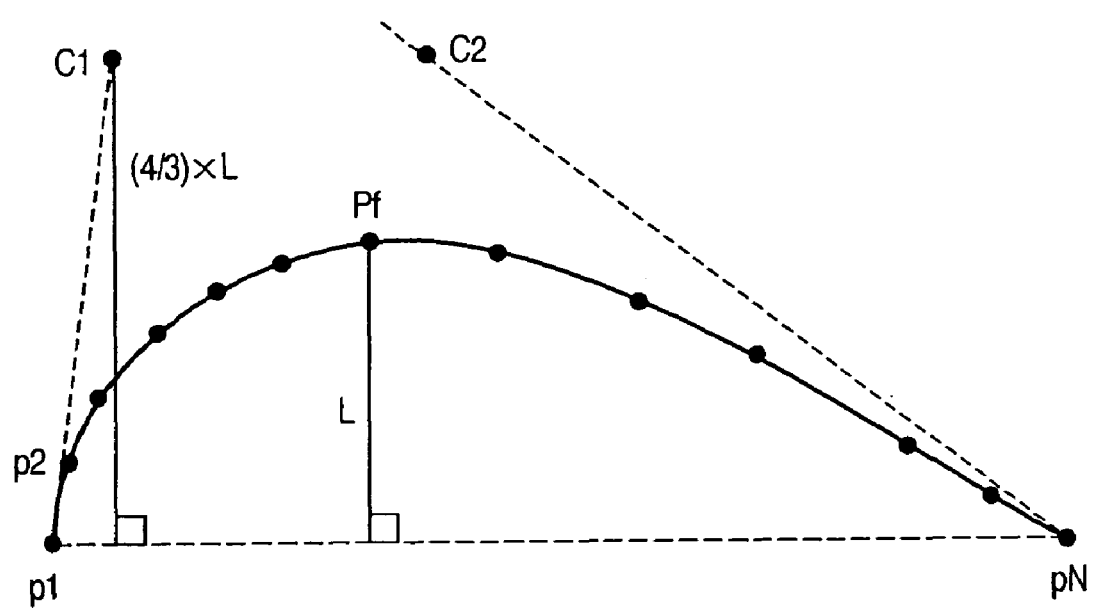
FIG. 19 is an explanatory view of curve approximation processing for a segment curve.

Next, the curve approximation processing on the segment curves will be described with reference to FIG. 19 showing one segment curve. In FIG. 19, N points extracted from line segment group on the segment curve are p1, p2, . . . , pN. A start point p1 and a terminal point pN of the segment curve are anchor points.

Note that the tangent line segments in the respective anchor points are extracted at step S1005 or upon anchor point extraction in the dividing to segment curves.

Then, a point pf on the curve farthest from a line segment p1pN connecting the anchor points p1 and pN is obtained. In the secondary approximation processing, to perform function approximation processing easily, approximation is performed such that a line segment C1C2 connecting control points becomes parallel to the line segment p1pN. Accordingly, points C1 and C2 are obtained, assuming that the distance between the point pf and the line segment p1pN is L, such that the distance from the points C1 and C2 to the line segment p1pN is $(4/3) \times L$.

For example, in a case where the coordinates of the point pf are (pfx, pfy), using the respective coordinate values (p1$x$, p1$y$) and (pN$x$, pN$y$) of the points p1 and pN and a tangent vector p1C1 (pcx, pcy), the coordinates (C1$x$, C1$y$) of the point C1 are $C1x = K \times pfx + p1x$ $C1y = K \times pfy + p1y$ $K = (3p1x - 4pfx)(pNy - P1y) + (pNx - p1x)(4pfy - 3p1y) + p1x(pNy - p1y) - p1y(pNx - p1x)/(3(pNy - p1y)pcx + 3(pNx - p1x)pcy)$.

Thus the coordinates can be uniquely determined from the pf coordinates. Further, the coordinates of the point C2 can be similarly obtained.

As the above-described curve approximation processing is performed on all the segment curves on the objects, the outline of the object is converted to outline data having straight lines and Bezier curves.

[Correction Processing]

The contour of the object is converted to outline vector data having straight lines and curves at steps S1001 to S1005. In this method, as the conversion is made from rough contour data only using horizontal vectors and vertical vectors and the processing is efficiently performed, the outline vector data generated by the series of steps has a type of peculiarity. At step S1006, the outline vector data is analyzed and the peculiarities are corrected.

Figure 20:
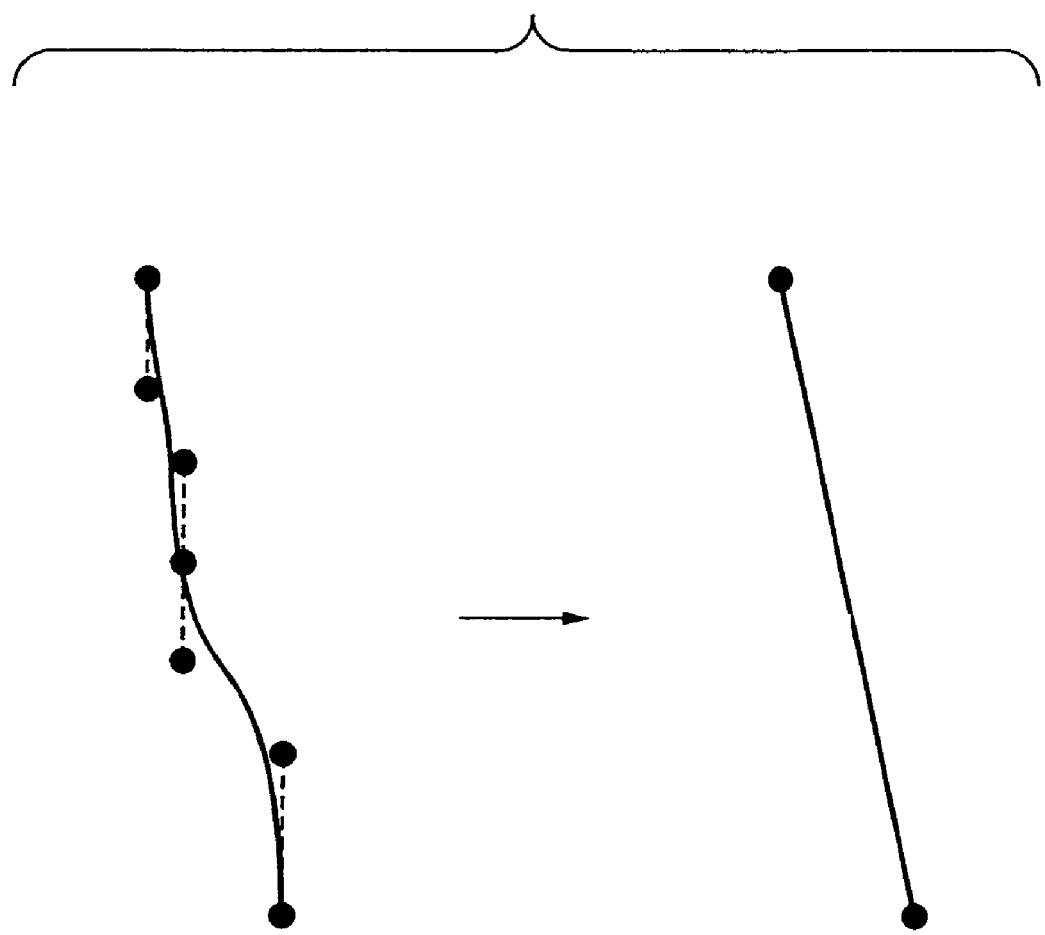
FIG. 20 shows a particular example of peculiarity of outline vector data.

FIG. 20 shows a particular example of peculiarity of out outline vector data. As rough contour data having only horizontal vectors and vertical vectors is analyzed and converted, the diagonal straight lines in the original figure are represented as curves. Regarding these curves, the distance between a straight line connecting anchor points and a control point is examined, and it is determined whether or not the line is a diagonal straight line. If it is determined that the line is a diagonal straight line, the control point between the anchor point is eliminated and the line is replaced with a diagonal straight line.

[Conversion Processing to Appli-Data]

Figure 21:
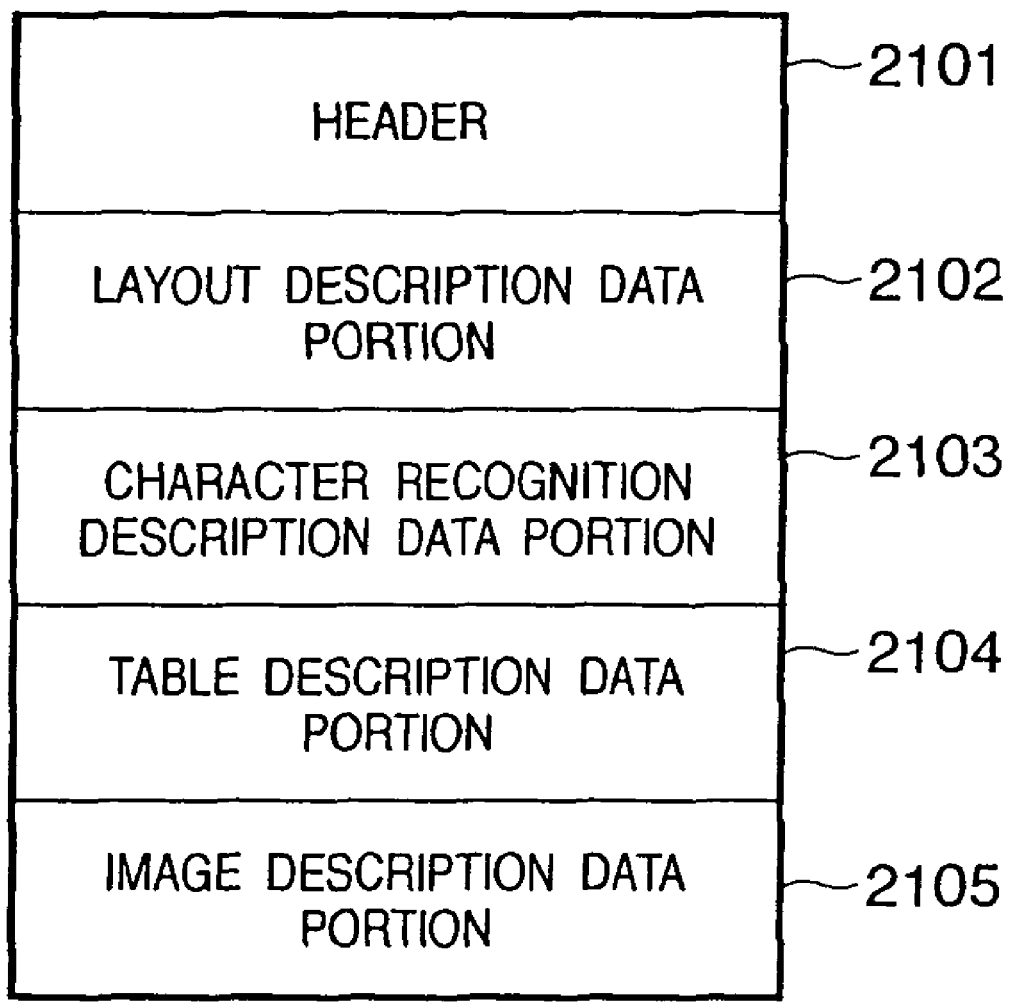
FIG. 21 is a table showing the data structure of document analysis output format (DAOF)

The result of the segmentation processing 303 on one page image data and the vector processing 304 is converted to an intermediate data format file as shown in FIG. 21. The data format is referred as a document analysis output format (DAOF).

FIG. 21 is a table showing the data structure of DAOF. In FIG. 21, a header 2101 holds information on document image data as the subject of processing. A layout description data portion 2102 holds attribute information of respective blocks in the document image data recognized as characters (TEXT), title (TITLE), caption (CAPTION), line art (LINEART), natural image (PICTURE), frame (FRAME) or table (TABLE), and rectangular address information of the blocks. A character recognition description data portion 2103 holds character recognition results obtained by character recognition of the TEXT, TITLE and CAPTION blocks. A table description data portion 2104 holds the details of the structure of the TABLE block. An image description data portion 2105 holds image data in the TABLE and LINEART blocks, cut out from the document image data.

The DAOF, stored as intermediate data, may be also stored as a file. However, in the file status, the respective objects cannot be reutilized by a so-called general document generation application program.

Next, the computerized document generation processing 309 for converting the DAOF to application data will be described.

Figure 22:
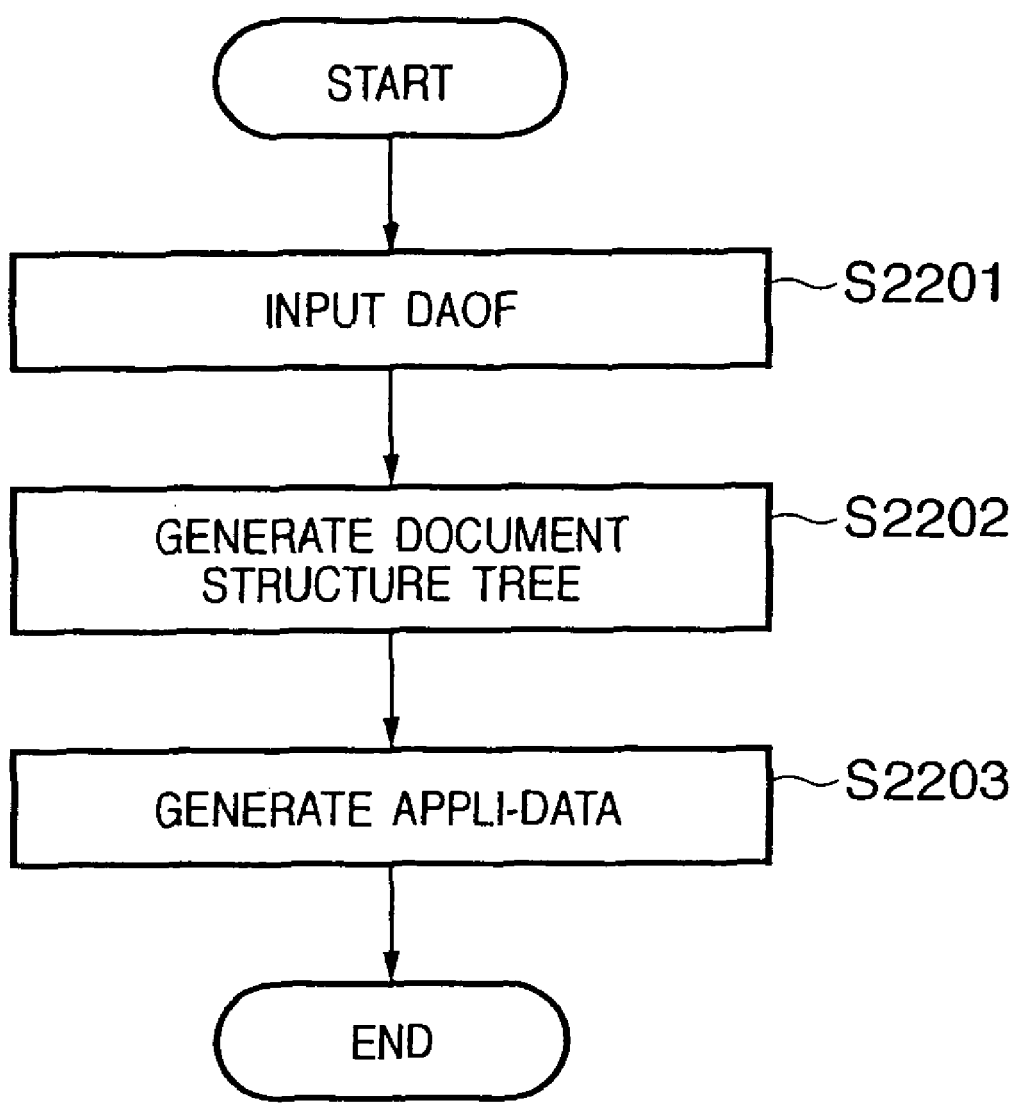
FIG. 22 is a flowchart showing the outline of the computerized document generation processing.

FIG. 22 is a flowchart showing the outline of the computerized document generation processing. First, at step S2201, DAOF data is inputted. Next, at step S2202, a document structure tree is generated as an original of appli-data. Then at step S2203, actual appli-data is generated from actual data of the DAOF based on the document structure tree.

Figure 23:
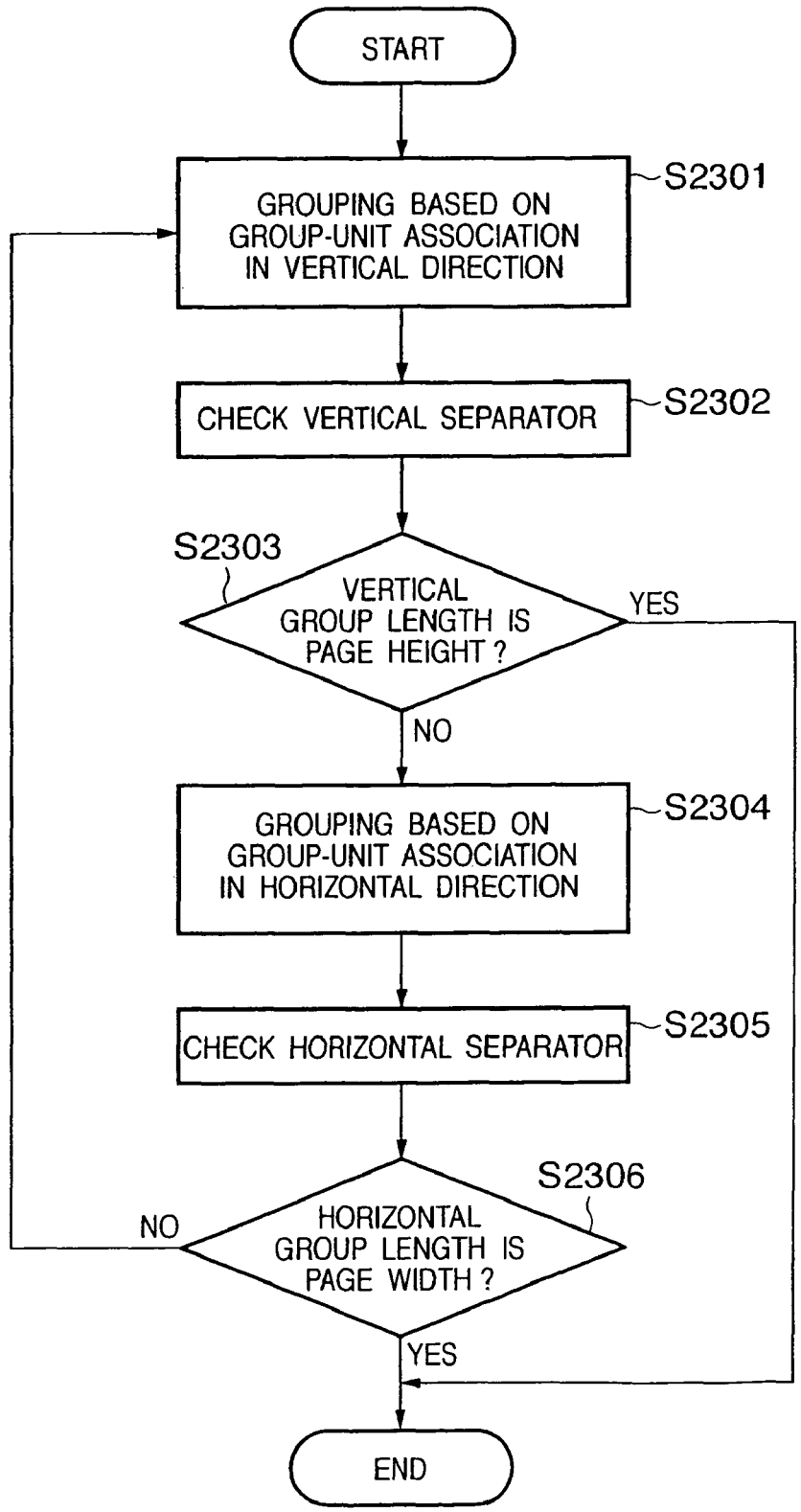
FIG. 23 is a flowchart showing the details of document structure tree generation processing.
Figure 24A:
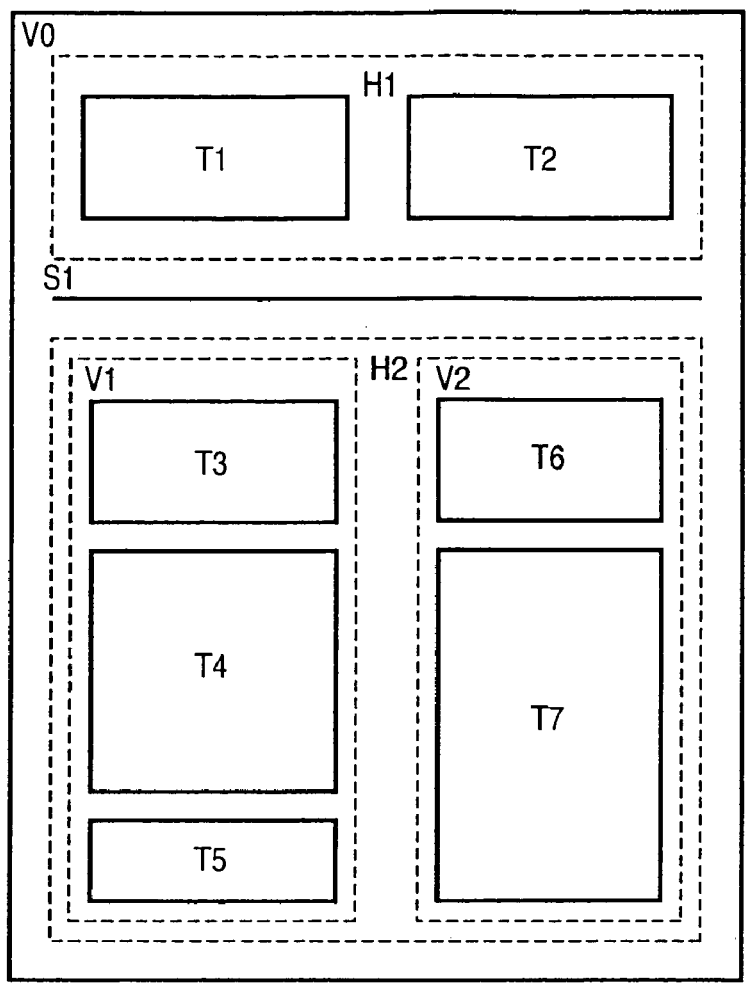
FIGS. 24A and 24B show a page structure and its document structure tree.
Figure 24B:
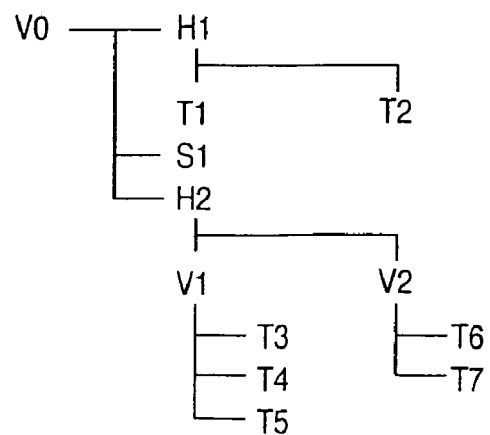

FIG. 23 is a flowchart showing the details of document structure tree generation processing. FIGS. 24A and 24B show a page structure and its document structure tree. Note that the basic rule of the entire control, the process flow moves from micro block (single block) to macro block (group of blocks). In the following description, "block" means a micro block or entire macro block.

First, at step S2301, regrouping is performed based on association in the vertical direction in block units. Immediately after the start, determination is performed in microblock units. The association can be defined, e.g., if blocks are close to each other or have approximately the same block width (height in the case of horizontal direction). Further, the information of distance, width, height and the like are extracted by referring to the DAOF.

FIGS. 24A and 24B show a page structure and its document structure tree. FIG. 24A shows an actual page structure, and FIG. 24B, its document structure tree.

As a result of the processing at step S2301, as shown in FIG. 24A, blocks T3, T4 and T5 are generated in one group V1, blocks T6 and T7 are generated in one group V2, and as shown in FIG. 24B, the groups V1 and V2 are generated in the same layer. Then at step S2302, the existence/absence of separator in the vertical direction is checked. The separator is an object having a line attribute in the DAOF in physical terms. In logical terms, the separator is an element to explicitly divide a document into blocks in the application. If a separator is detected, redividing is performed in the same layer.

Next, at step S2303, it is determined whether or not there is no dividing any more by utilizing a group length. In a case where the group length in the vertical direction is equal to a page height, the generation of document structure tree is ended. In FIGS. 24A and 24B, as there is no separator and the group height is not the page height, the process proceeds to step S2304, at which regrouping is performed in block units based on association in the horizontal direction. Also, immediately after the start, the first determination is made in micro block units. Note that the association and determination information are defined as in the case of the vertical direction.

In FIGS. 24A and 24B, a block H1 is generated from the blocks T1 and T2, and a block H2 is generated from blocks V1 and V2 as a higher layer group. At step S2305, the existence/absence of horizontal separator is checked. In this example, as a separator S1 exists, the separator is registered in the tree, thereby layers H1, S1 and H2 are generated.

Next, at step S2306, it is determined whether or not there is no dividing exists any more by utilizing the group length. Note that in a case where the horizontal group length is equal to the page width, the generation of document structure tree is ended. Further, if the horizontal group length is not equal to the page width, the process returns to step S2301, to repeat the checking of association in the vertical direction in a higher layer. In this example, as the dividing width is equal to the page length, the generation of document structure tree is ended. Finally, a top layer V0 indicating the entire page is added to the document structure tree.

After the completion of document structure tree, appli-data is generated based on the information of the document structure tree (step S2203). More specifically, the appli-data generation in this example is as follows.

As the block H1 has two blocks T1 and T2 in the horizontal direction, output is performed from two columns. Then the internal information of the block T1 (by referring to DAOF; writing obtained as a result of character recognition, image or the like) is outputted. Then the internal information of the block T2 is outputted, and the separator S1 is outputted. Next, as the block H2 has two blocks V1 and V2 in the horizontal direction, output is performed from two columns. The internal information is outputted from the blocks T3, T4 and T5 of the block V1, then the internal information is outputted from the blocks T6 and T7 of the block V2.

By the above processing, conversion processing to appli-data can be performed.

Second Embodiment

Next, a second embodiment of the present invention will be described in detail with reference to the drawings. Note that in the vector processing in the first embodiment, as shown in FIG. 10, noise elimination (step S1001) is performed and then tangent line segments are extracted (step S1002), however, the problem is that the analysis (matching) in noise determination as shown in FIGS. 11A and 11B is heavy. Further, in the first embodiment, the noise elimination is performed on only a simple pattern, however, more accurate noise elimination is required for generation of outline with high image quality. The noise elimination is very significant processing.

That is, the processing becomes heavy in more detailed noise analysis, and the problem becomes more serious. However, noise handled in the present method is 1-pixel size unevenness noise which can be determined as noise to horizontal and vertical components. Further, the noise as shown in FIGS. 11A and 11B is noise in horizontal and vertical directions.

Accordingly, in the second embodiment, the noise as shown in FIGS. 11A and 11B is regarded as line segments in vertical and horizontal directions. Then tangent line segments are extracted, and only if noise exists on a tangent line segment, the noise is analyzed and filtered-out.

In the case of the above processing, regarding noise not existing on a tangent line segment, the detailed analysis and filter-out can be omitted.

Figure 25:
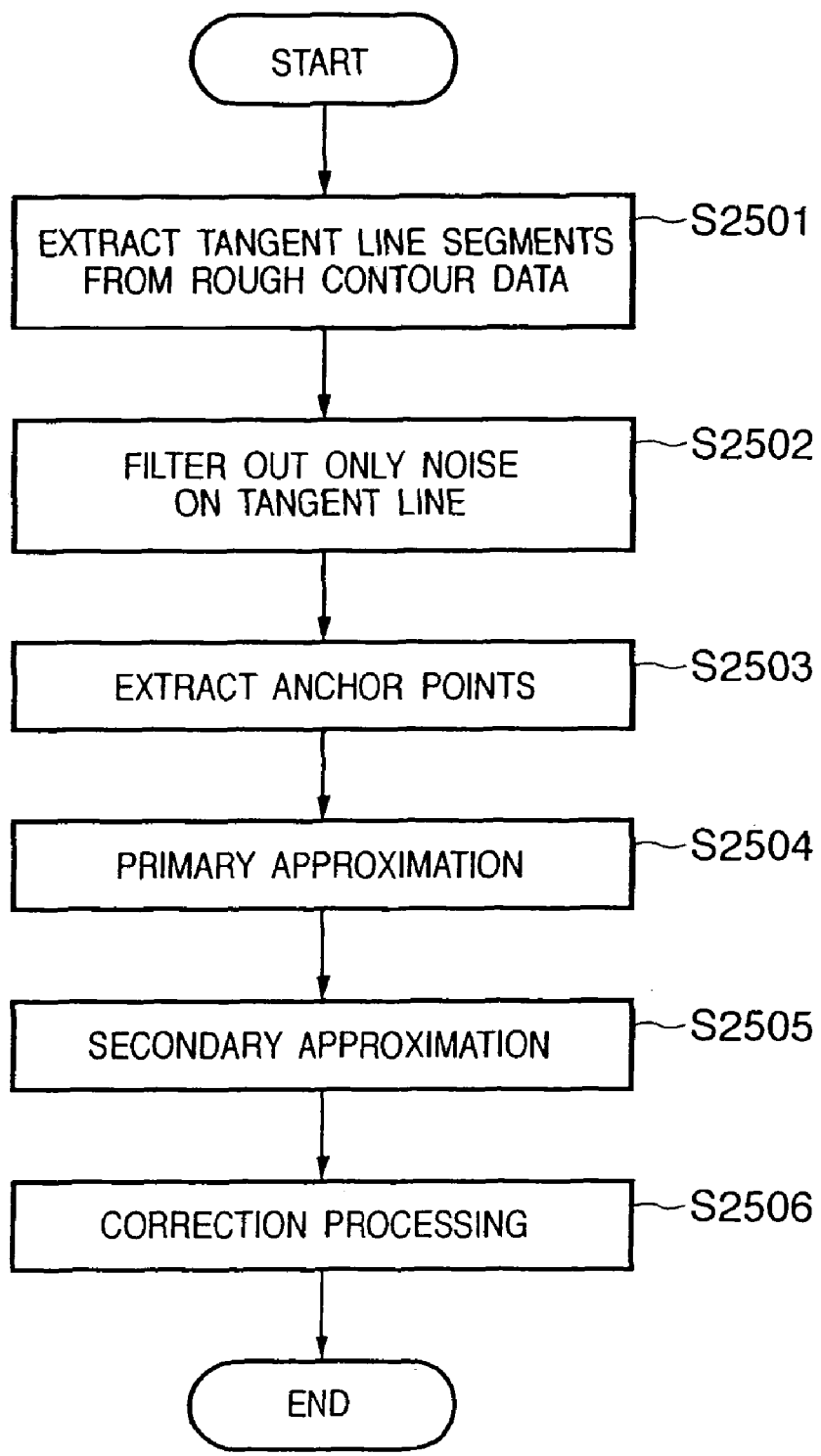
FIG. 25 is a flowchart showing processing of conversion in rough contour data to outline vector data according to a second embodiment of the present invention.

FIG. 25 is a flowchart showing the processing of conversion in rough contour data to outline vector data according to the second embodiment of the present invention.

First, at step S2501, rough contour data is extracted, and tangent line segment extraction is performed on the rough contour data. At this time, unevenness portions on the rough contour which cannot be determined as noise to be filtered-out or not are handled as vertical and horizontal line segments on the rough contour. At step S2502, only noise on the tangent line segments are examined in detail, and noise elimination is performed.

In the subsequent processing at steps S2503 to S2506, as in the case of the processing at steps S1003 to S1006 in FIG. 10 described in the first embodiment, anchor points are extracted, and portions among the anchor points are subjected to curve approximation processing.

By the above processing, wasteful noise analysis can be omitted, and high-speed processing can be realized.

Third Embodiment

Next, a third embodiment of the present invention will be described in detail with reference to the drawings. Note that in the first embodiment, in the tangent line segment extraction, the tangent line segments extracted under the respective extraction conditions are equally handled, however, those tangent line segments may be handled in accordance with priority order.

A line segment with a higher priority represents the object shape more accurately. The prioritizing is made for the purpose of handling a line segment with a higher priority as a more significant line segment than a line segment with a lower priority.

For example, among the tangent line segments extracted under the conditions (1) to (4) in the first embodiment, the highest priority is allocated to the tangent line segment extracted under the condition (1), then the priority is lowered as the number is increased, such that the lowest priority is allocated to the tangent line segment extracted under the condition (4).

Figure 26A:
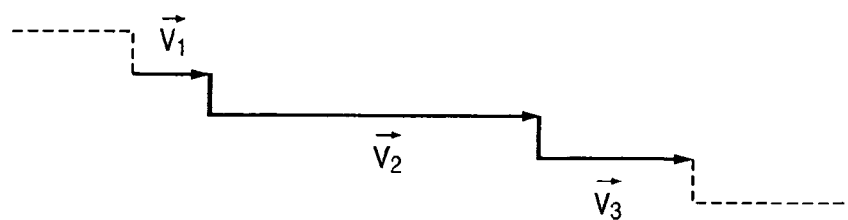
FIGS. 26A to 26C are explanatory views showing anchor point extraction according to a third embodiment of the present invention.
Figure 26B:
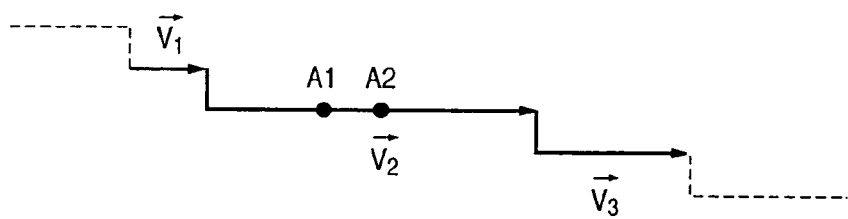

At step S1003 in FIG. 10, the anchor point extraction is performed not to leave a line segment with a lower priority on the tangent line segment. For example, in FIG. 26A where a line segment V2 has a high priority is a tangent line segment, if the tangent line segment V2 has a high priority, anchor points are extracted as shown in FIG. 26B by the above-described method. If the extracted line segment has a low priority, an anchor point is extracted without leaving the line segment as shown in FIG. 26C.

Figure 26C:
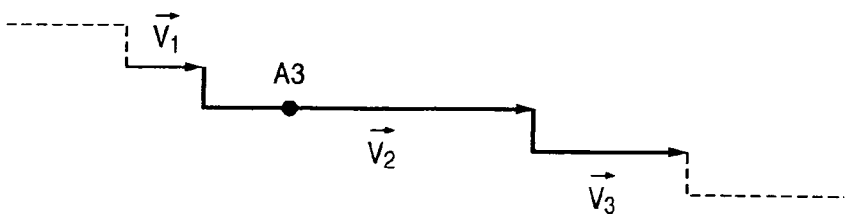

Note that the position of an anchor point A3 in FIG. 26C is obtained from the size ratio between line segments V1 and V3.

Next, at step S1004, the portion between the anchor points is subjected to primary approximation with Bezier curve. In this processing, the curve is changed based on whether the anchor points have been extracted from high-priority line segment or low-priority line segment. An anchor point extracted from a high-priority line segment is handled as a high-priority anchor point, while an anchor point extracted from a low-priority line segment is handled as a low-priority anchor point.

Figure 27A:
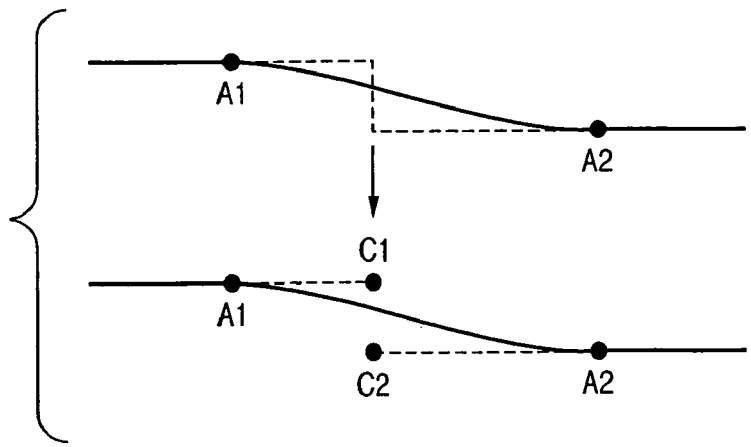
FIGS. 27A to 27C are explanatory views showing the curve approximation according to the third embodiment.
Figure 27B:
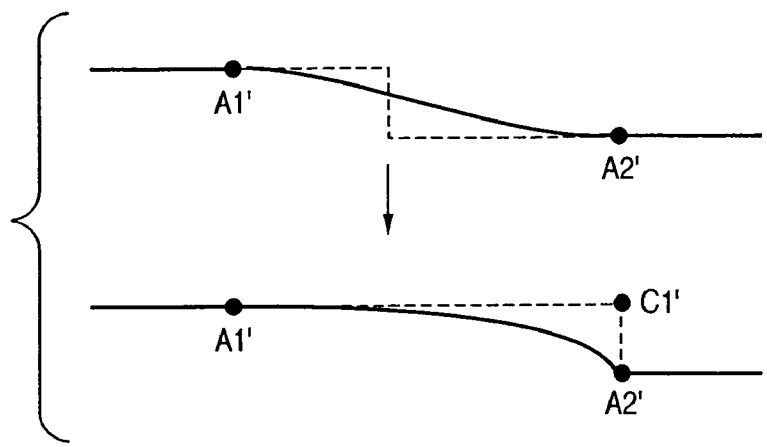
Figure 27C:
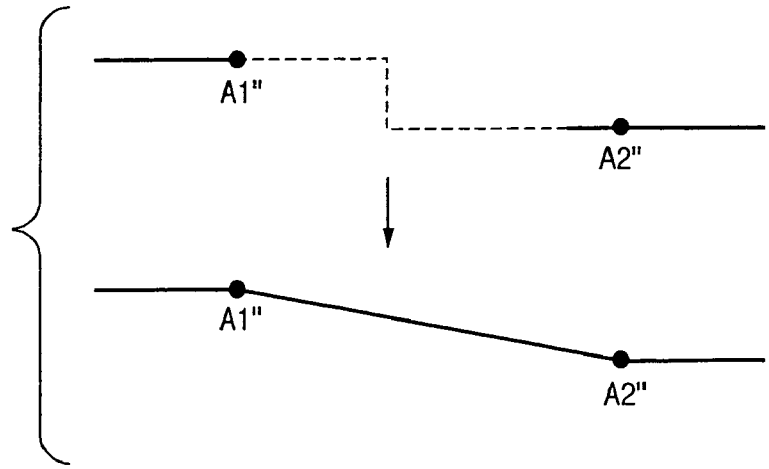

For example, a portion having high-priority anchor points at both ends is approximated with a cubic Bezier curve as shown in FIG. 27A. Further, a portion having a high-priority anchor point and a low-priority anchor point is approximated with a quadratic Bezier curve as shown in FIG. 27B. Further, a portion having low-priority anchor points at both ends is approximated with a linear line as shown in FIG. 27C.

Note that in the Bezier approximation, the positions of control points are determined based on the proportion of line segments V1, V2, V1' and V2' among the points.

As described above, the analysis, i.e., estimation of tangent line segment obtained from a profile line, is performed in more detail, and the respective processings are changed in accordance with the result of analysis. The number of points can be reduced in a wasteful portion while the image quality can be maintained.

Fourth Embodiment

Next, a fourth embodiment of the present invention will be described in detail with reference to the drawings. In the first embodiment, simplified function approximation processing using one point on a segment curve is employed as secondary approximation processing. However, in the simplified method of the first embodiment, in some cases, an approximated curve is extremely different from a segment curve point sequence in accordance with curve dividing accuracy. In such case, it may be determined whether or not the function approximation is excellently performed. If the error is large to an original curve, the function approximation may be performed again, thereby the accuracy of function approximation processing can be improved.

Note that the determination method, which should also be simple, will be described below.

Figure 28:
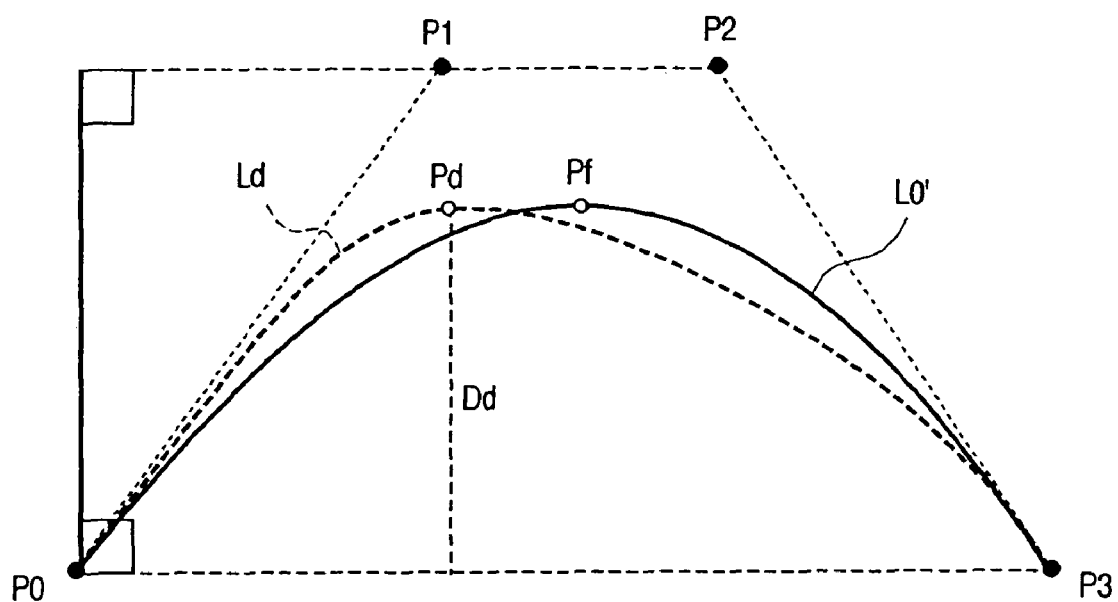
FIG. 28 is an explanatory view of accuracy determination in curve dividing according to a fourth embodiment of the present invention.

FIG. 28 is an explanatory view of accuracy determination in curve dividing according to the fourth embodiment of the present invention. As shown in FIG. 28, when a point sequence Ld of a segment curve is subjected to function approximation using a characterizing point Pd, a curve L0' is obtained. If the position of a point Pf on the curve L0' corresponds with that of the characterizing point Pd, it can be determined that the curve approximation has been excellently performed. If the distance between the points Pd and Pf is long, there is a high probability that the approximation has failed and the obtained curve is different from the original curve.

For example, in the case of failed curve approximation, i.e., when the distance between the point Pd and the Pf is equal to or greater than a predetermined value, the curve is divided to two segment curves P0-Pd and Pd-P3 with a point P1 as a new anchor point, and the above-described function approximation processing is performed on the respective segment curves. As the dividing processing in the failed curve approximation can be repeatedly performed, the curve approximation can be performed with high accuracy in accordance with a threshold value.

As described above, according to the present embodiment, a rough profile line only having vertical vectors and horizontal vectors is extracted from binary image data and the curve is analyzed by using the rough profile line, thereby high-speed processing and high-quality outline generation can be realized. More particularly, 0°/90° tangents of original object are estimated from the profile line, and portions among the estimated tangents are subjected to curve approximation.

Note that the curve approximation includes first approximation applied to fine portions, and second approximation to approximate curve portions drawing large arcs.

Further, the first problem that the processing is heavy is addressed as follows.

In the present embodiment, rough contour data obtained from raster image data is used without any processing, and horizontal and vertical vectors are handled. The analysis includes noise determination, characterizing amount extraction, local curve approximation, and pattern matching is employed as analysis method. The pattern matching can be very efficiently performed on horizontal and vertical vectors. That is, as the repetitive computation of primary approximation processing and complicated processings are omitted, and further, as temporary conversion to short vectors is omitted upon analysis, the processing of the present embodiment is very effective in point of performance.

Further, in the curve approximation processing, as a Bezier curve with parallel limitation is used, a curve can be uniquely determined by extracting one charactering point between anchor points.

Note that as the characterizing point is extracted as a point on the curve farthest from the portion between the anchor points, the repetitive computation such as acquisition and optimization of error can be omitted.

Accordingly, the method of the present embodiment is very effective in point of performance.

As described above, in the present embodiment, in the series of processings of analysis using pattern matching on rough contour, local curve approximation, and curve approximation processing with parallel limitation, the performance can be greatly improved in comparison with the conventional methods.

On the other hand, the second problem that the image quality is degraded in the simplified method is addressed as follows.

In the present embodiment, when one profile line is converted to outline vector data, a portion of fine changes on the object where the degradation of image quality is conspicuous is subjected to the first approximation processing as curve approximation by pattern matching. Note that as the pattern matching on a fine portion is changed in correspondence with the result of analysis of tangent line segment or the like, a smooth line represented with a reduced amount of data can be obtained.

Further, in the present embodiment, as a simplified method using rough contour data without any change is employed, the obtained curve has a type of peculiarity. Such patterned peculiarity is modified by performing correction processing finally. Note that as the correction processing is performed on outline data having straight lines and curves (data having a greatly reduced data amount), the processing does not especially influence the performance.

Finally, the problem of object size is addressed as follows.

In the present embodiment, as pattern matching is used in the noise analysis, shape analysis and local approximation, and the pattern matching is changed in correspondence with object size and profile line length, the processing can handle various objects including fine objects and large objects. As a parameter changed by pattern matching has a length for the rough profile line, the parameter can be flexibly changed for each pattern matching, and the processing can handle various objects and profile lines, including fine objects/profiles to large objects/profile lines.

Fifth Embodiment

Next, a fifth embodiment according to the present invention will be described in detail with reference to the drawings. In the fifth embodiment, upon conversion of image data to outline data by the Bezier curve approximation, capable of high-speed operation, the processing is performed on a general computer system or a specialized image processing system, in the form of image processing software or a device driver or another application including digital image processing.

Figure 29:
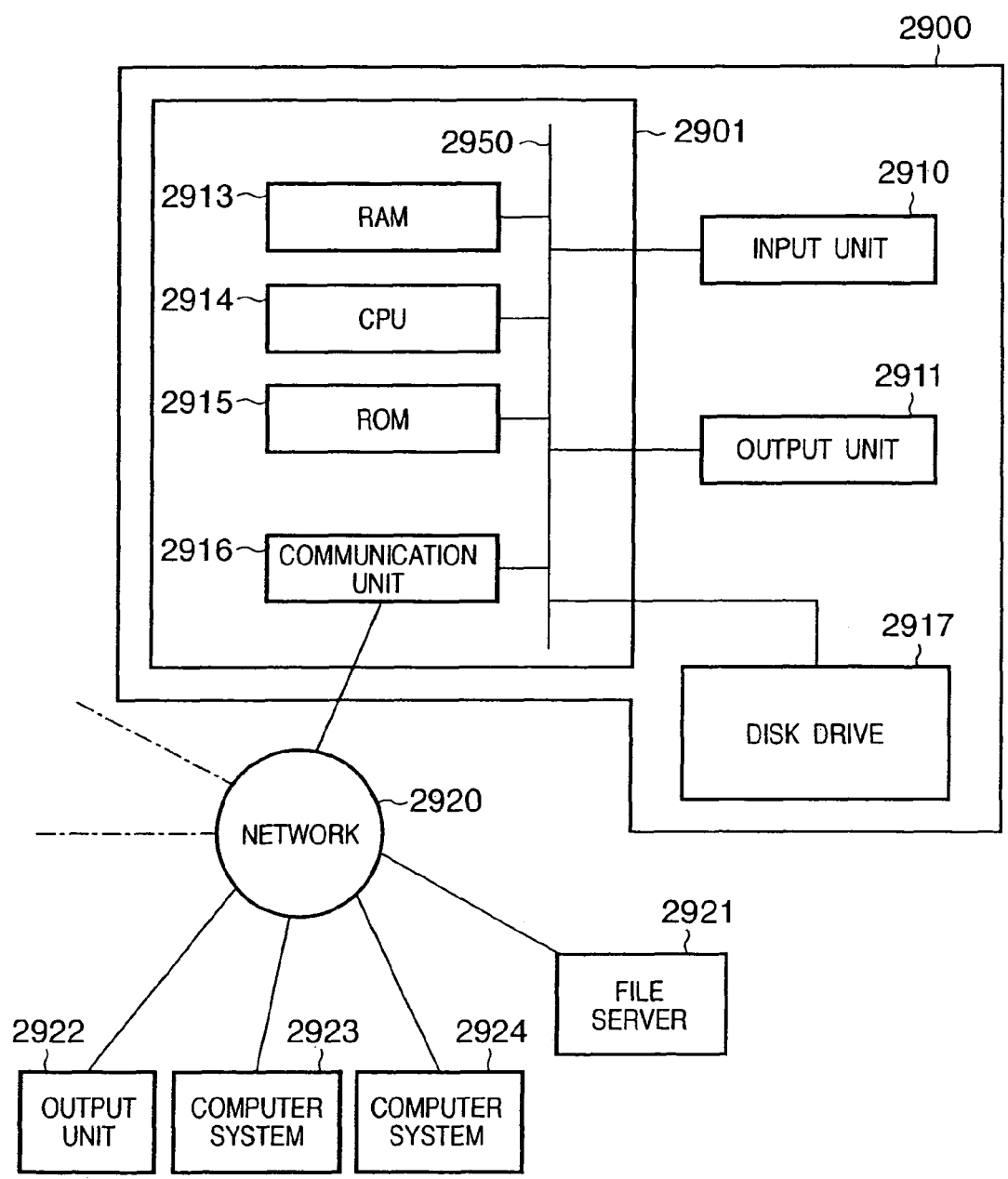
FIG. 29 is a block diagram showing the configuration of a computer system 100 according to a fifth embodiment.

Hereinbelow, the contents of image processing executed on a general computer system will be described with reference to the drawings. FIG. 29 is a block diagram showing the configuration of a computer system 2900. The computer system 2900 has a computer 2901 including a RAM 2913, a CPU 2914, a ROM 2915 and a communication unit 2916, and has an input unit 2910, an output unit 2911 and a disk drive unit 2917, respectively connected to the computer 2901.

The input unit 2910 includes, e.g., a scanner, a CCD camera, a CD-ROM drive and a digital camera, at least one or more of which can be connected to the computer 2901. Character information and image information are inputted via the input unit 2910 as computerized data into the computer 2901.

The output unit 2911 includes a printer to print-output character information and/or image information on a printing medium, a monitor to display visualized image information and the like on a display unit such as a CRT or a liquid crystal display, and the like. As in the case of the input unit 2910, at least one or more of plural types of devices in the output unit 2911 can be connected to the computer 2901.

The RAM 2913 can be utilized as a work area for execution of computation processing by the CPU 2914. An information processing program for converting image data into outline vector data by Bezier curve approximation capable of high-speed computation, as the subject of the present invention, can be stored in the ROM 2915.

Also, information processing program for converting image data into outline vector data by Bezier curve approximation capable of high-speed computation, as the subject of the present invention, can be stored in the disk drive 2917. Further, as in the case of the RAM 2913, the disk drive 2917 can be utilized as a work area for execution of computation processing by the CPU 2914.

For example, position information of start and terminal points of segment dividing to be described in detail later, and position information of characterizing point and control points can be respectively stored. The CPU 2914 can perform the Bezier curve approximation processing while sequentially reading these position information. FIG. 41 is a table showing position information of start point, terminal point, characterizing point and control points of divided segments stored in the disk drive 2917 or the RAM 2913 (they function as storage means).

The input unit 2910, the output unit 2911, the RAM 2913, the CPU 2914, the ROM 2915, the communication unit 2916 and the disk drive 2917 are interconnected via a bus 2950 in the computer system 2900, and can perform mutual data transmission/reception.

Further, the computer system 2900 can be connected to a network 2920 via the communication unit 2916 included in the computer 2901, and can perform data transmission/reception to/from an external computer system 2923, an external computer system 2924, a file server 2921, and an output unit 2922 such as a network printer.

The CPU 2914 performs processing by the information processing program on computerized data inputted from the input unit 2910. The result of image processing can be stored in the disk drive 2917, outputted via the output unit 2911, or delivered via the network 2920. Further, the data can be stored in a file server 2921 on the network 2920 and shared between the computer systems 2923 and 2924.

Further, the result of image processing delivered via the network 2920 can be outputted via the output unit 2922 connected to the network.

Further, it may be arranged such that computerized data is received with the computer system 2920 from the computer system 2923, the computer system 2924 or the file server 2921 connected to the network 2920, and the information processing for converting image data to outline vector data by the Bezier curve approximation capable of high-speed computation can bb applied to the received computerized data.

Next, the flow of particular processing of computerized data inputted in a computer system 100 will be described.

Figure 30:
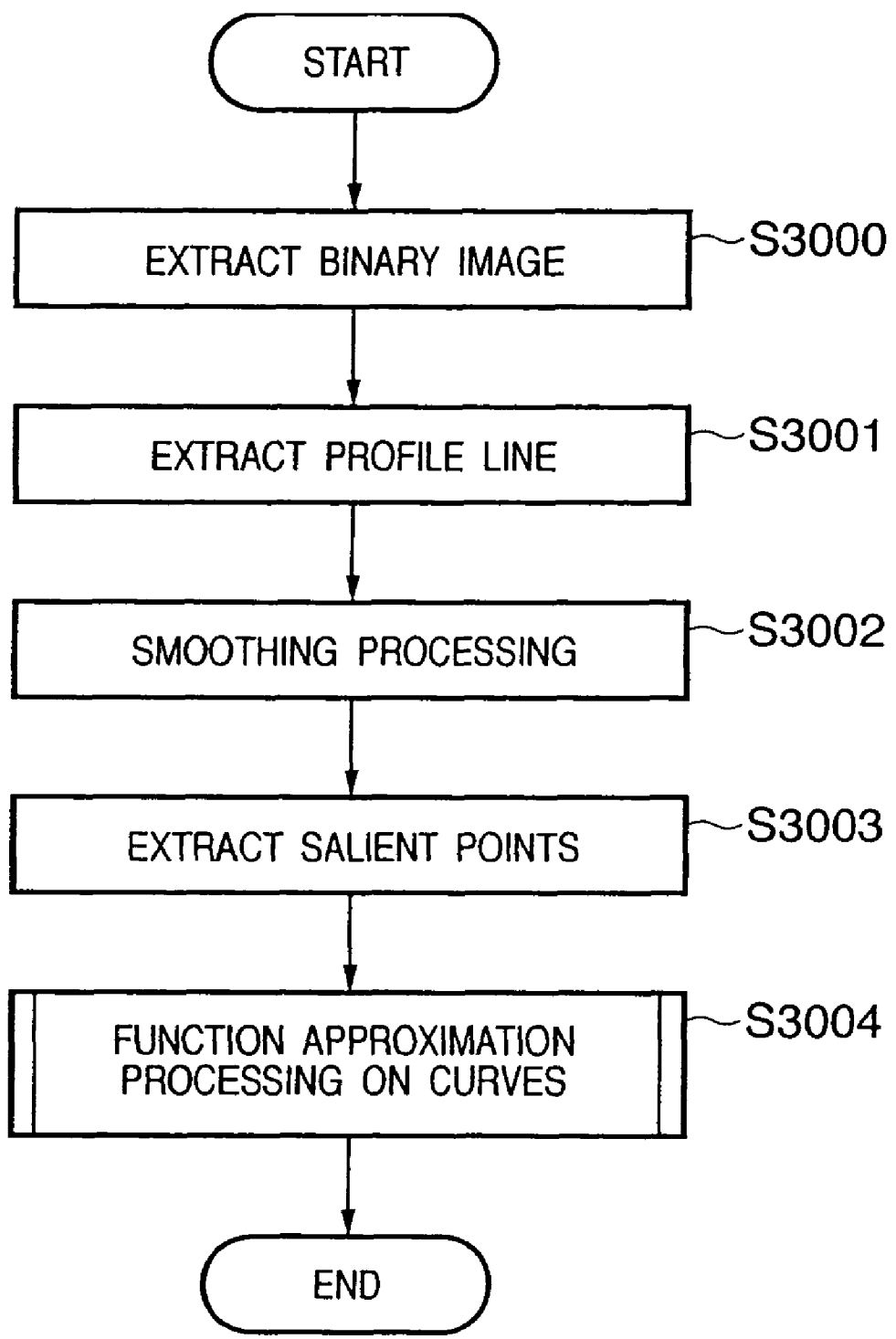
FIG. 30 is a flowchart showing the flow of processing of representing and converting the contour of image source by outline function approximation and converting the contour to vector data based on input computerized data.

FIG. 30 is a flowchart showing the flow of processing of representing the contour of image source by outline function approximation and converting the contour to vector data based on input computerized data.

First, at step S3000, the CPU 2914 extracts a binary image such as a character portion or a line art portion as the subject of outline processing from an input image source. Next, at step S3001, the CPU 2914 extract a profile line from the binary raster image data obtained at step S3000.

At step S3002, the CPU 2914 performs processing for smoothing the profile line extracted at step S3001, and at step S3003, extracts salient points from the profile line.

Figure 40:
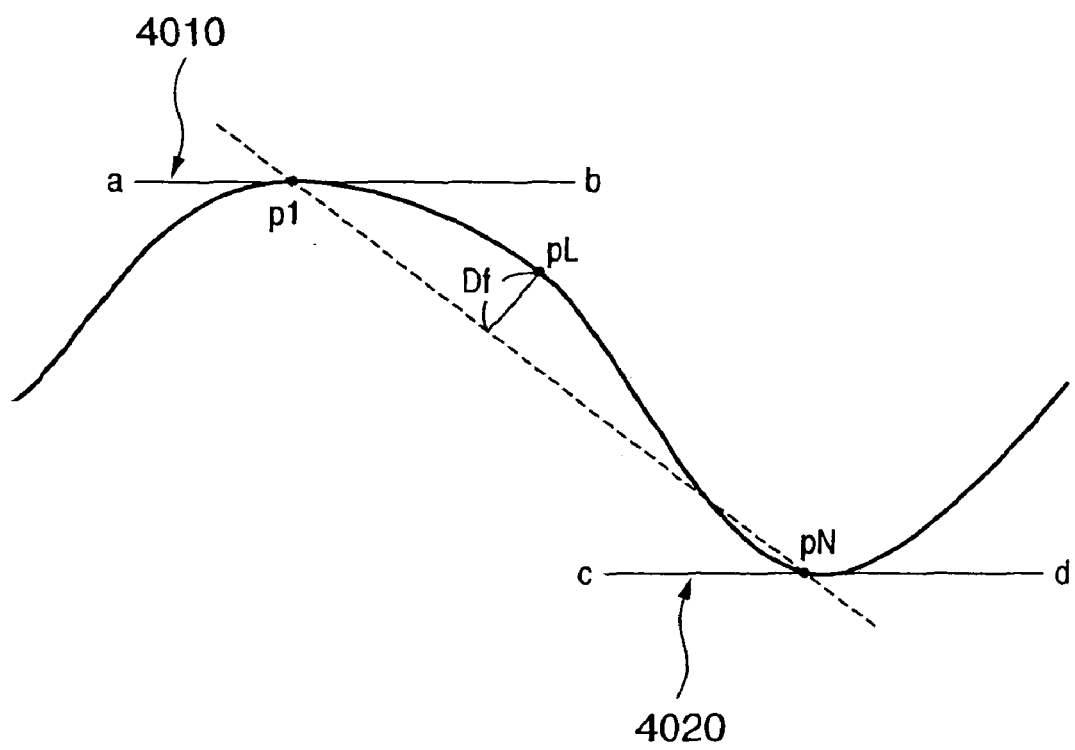
FIG. 40 is an explanatory view of characterizing point for deriving a Bezier curve in a simplified manner.

Next, at step S3004, the CPU 2914 performs function approximation processing on curve portions among the salient points extracted at step S3003, thereby converts the binary raster image data to vector data represented by anchor points and control points. In the function approximation processing at step S3004, approximation using a Bezier function is performed. Upon deriving two control points forming a Bezier curve from a point sequence forming a curve connecting two anchor points, the derivation processing is performed in a simplified manner, thereby the amount of computation processing is reduced, and high-speed function approximation processing can be realized. The execution of simplified Bezier curve derivation processing means, upon deriving a Bezier curve connecting two anchor points (p1 and pN in FIG. 40), it is assumed that a control point is in parallel to the anchor points, thereby a Bezier curve can be derived from five characterizing amounts, i.e., the two anchor points (p1 and pN), respective tangent vectors (ab and cd) in the anchor points, and one characterizing point on the curve (e.g., a point pL in FIG. 40).

Generally, the function approximation processing requires a vast amount of repetitive computation processing of obtaining errors between a curve and target point sequence and optimizing the curve. However, according to the present embodiment, a Bezier curve can be uniquely derived by extracting five points (two anchor points, two control points and one characterizing point) from a point sequence forming the curve. As the repetitive computation processing is omitted, the amount of computation processing can be greatly reduced, and the processing can be performed at high speed. Thus the outline processing for real time can be realized by even software processing.

Next, the details of the respective steps in the flowchart of FIG. 30 will be described. At step S3000 in FIG. 30, the CPU 2914 performs edge processing on the input computerized data, to convert the data to monochrome binary image data. At this time, it may be arranged such that the CPU 2914 performs recognition processing on the binary image, to classify the image portions to a character area, a line art area and the like, and extracts binary images from the classified areas. Further, if an original input image is a binary image, this processing can be omitted.

Figure 32A:
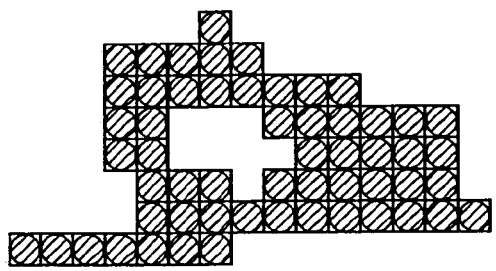
FIG. 32A shows an example of binary image raster data.
Figure 32B:
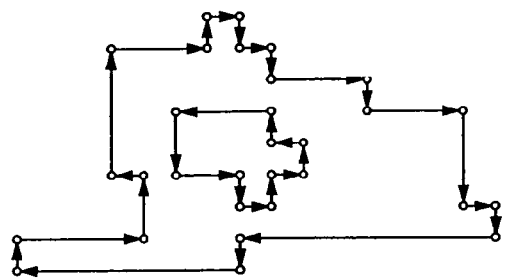
FIG. 32B shows extracted contour points.

At step S3001, the CPU 2914 converts the binary image to profile line data. As the profile line extraction method, various methods including tracing a profile line with the center of dot of raster image data as one point or tracing a profile line with contour of one dot as four points. In the present embodiment, for the sake of simplification of explanation, a rough contour point sequence is extracted by using the profile line tracing proposed in Japanese Patent Application Laid-Open No. 05-108823. According to this method, rough contour points as shown in FIG. 32B are extracted from binary image data as shown in FIG. 32A. At step S3002, the CPU 2914 performs smoothing processing on the extracted rough contour point sequence (hereinbelow, also referred to as a "point sequence"). In the smoothing processing, processing to mitigate unevenness on the contour straight line such as notch elimination processing is performed, and at the same, mitigation of step-like unevenness formed with a profile line in a diagonal direction is performed.

Figure 32C:
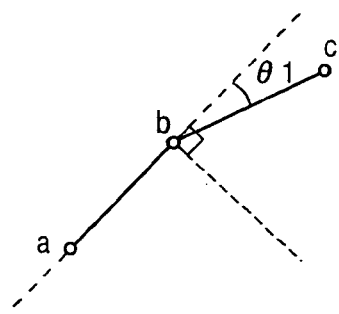
FIGS. 32C and 32D are explanatory views of salient point extraction.
Figure 32D:
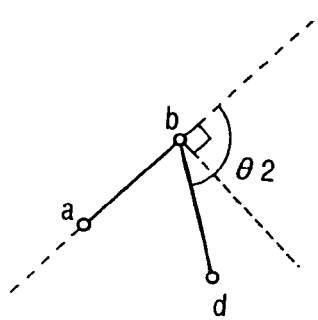

Next, the process proceeds to step S3003, at which the CPU 2914 extracts the salient points from the profile line smoothed at step S3002. The salient point means a point where the change of vector connecting adjacent point sequence is an acute angle. In FIG. 32C, as an angle θ1, between a vector ab formed with a point sequence a, b, and a vector bc formed with a point sequence b, c, is an acute angle, the CPU 2914 extract the angle θ1 as a salient point. On the other hand, in FIG. 32D, as an angle θ2, between the vector ab and a vector bd formed with a point sequence b, d, is an obtuse angle, the CPU 2914 does not extract this angle as a salient point.

Figure 33:
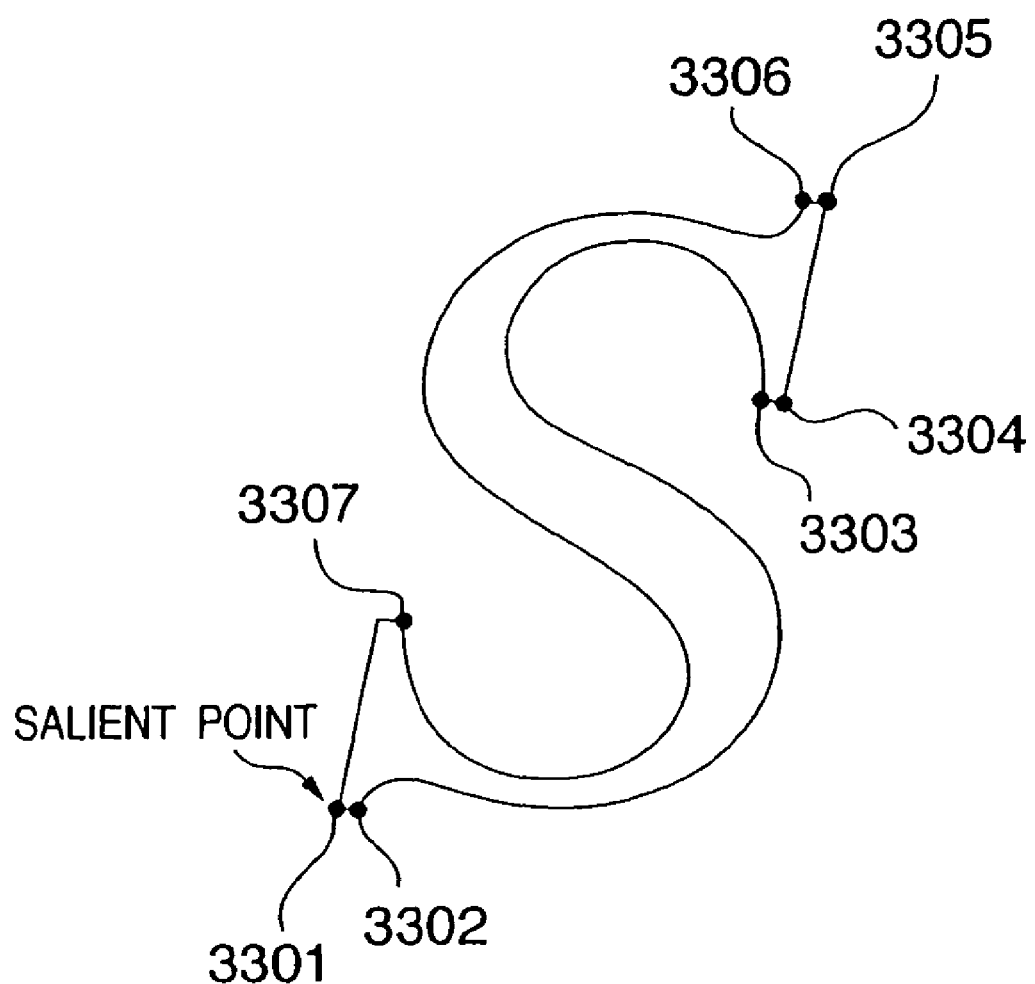
FIG. 33 shows an example where a character "S" is handled as a contour point sequence.

For example, as shown in FIG. 33, assuming that a character "S" is handled as a contour point sequence, points 3301 to 3307 are obtained as salient points. Further, upon extraction of salient point, in addition to the above-described condition whether or not the angle between adjacent point sequences is acute, if the distance between continuous points is greater than a predetermined threshold value, the CPU 2914 extracts the both end points as salient points. This extraction is made for prevention of rounding of a straight line of the figure.

Figure 31:
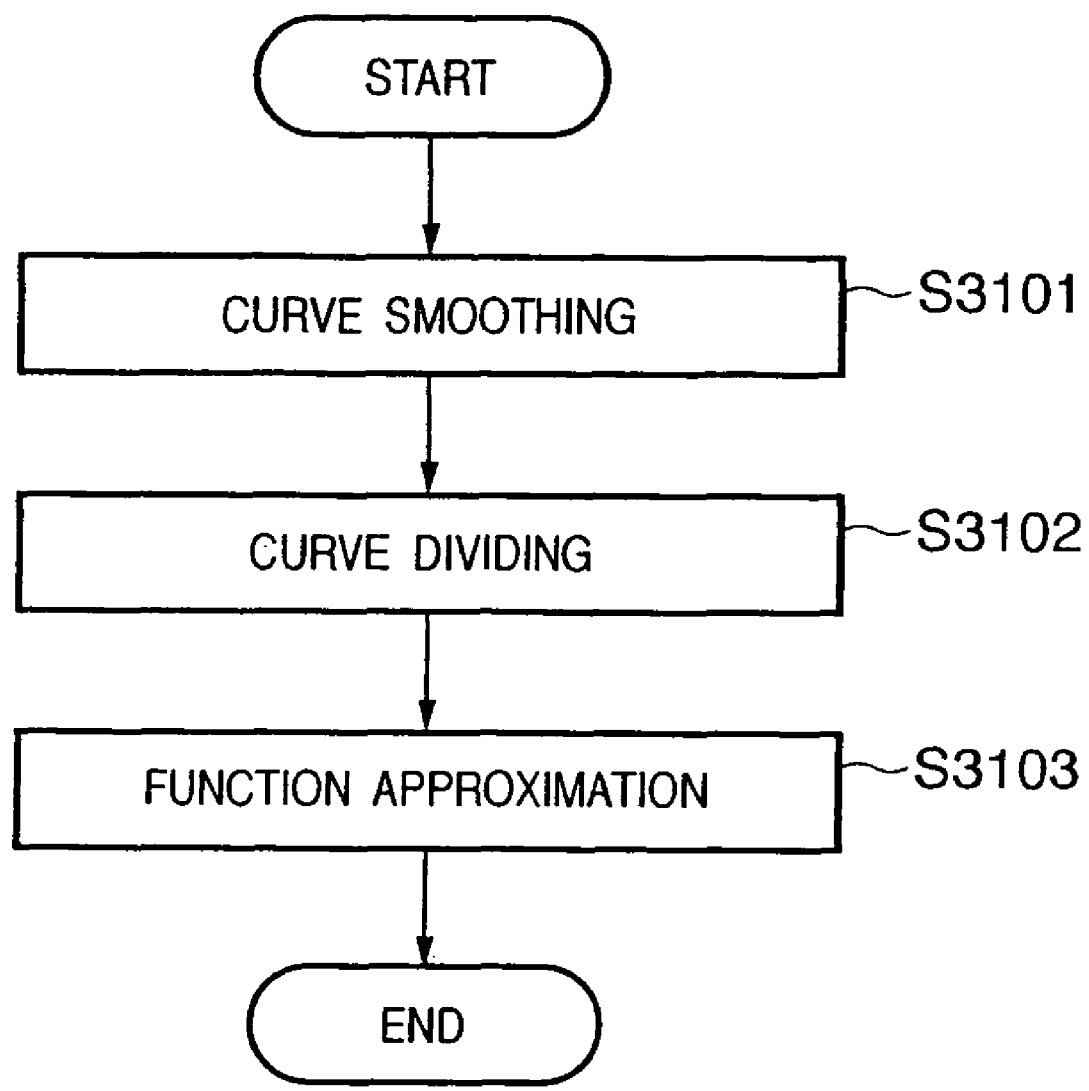
FIG. 31 is a flowchart showing the flow of processing of replacing a point sequence constructing a curve between salient points with a Bezier function.

Next, the Bezier approximation processing (step S3004) on curves among the salient points according to the present embodiment will be described. FIG. 31 is a flowchart showing the flow of processing (approximation) of replacing a point sequence constructing a curve between salient points with a Bezier function.

First, at step S3101, the curve between the salient points is smoothed, then at step S3102, the smoothed curve is divided in segment curves each can be replaced with one Bezier curve. By performing the function approximation processing on Bezier curves of divided segments, the curve between the salient points can be represented as a set of Bezier curves obtained from the function approximation processing.

Figure 38:
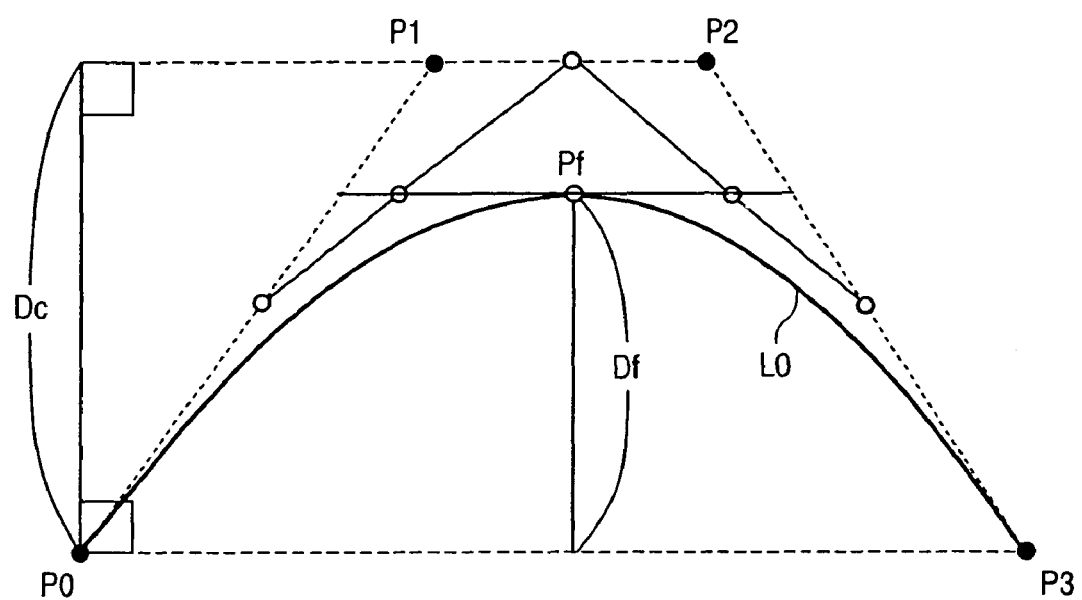
FIG. 38 shows an example of a Bezier curve approximate to a segment curve.

FIG. 38 shows an example of a Bezier curve approximate to segment curves (note that white points in the figure indicate middle points of respective line segments). As shown in FIG. 38, a Bezier curve L0 is drawn as a curve passing through a start point P0 and a terminal point P3 among four points defining the Bezier curve, the anchor points P0 and P3 and control points P1 and P2, and as determined by the direction of the two control points P1 and P2 and the distance therebetween. The Bezier curve L0 is in contact with respective line segments P0P1 and P2P3 in the start point P0 and the terminal point P3. The Bezier curve L0 is calculated as the following cubic Bezier curve B(t).

$$B(t)=(1-t)^3 \cdot P0+3(1-t)^2 \cdot t \cdot P1+3(1-t) \cdot t^2 \cdot P2+t^3 \cdot P3 \quad (1)$$

(0≦t≦1: t is a coefficient parameter)

In this case, to perform the function approximation processing by determining the control points P1 and P2 by repetitive computation processing based on the anchor points P0 and P3, a vast amount of repetitive computation processing i.e. obtaining the error between the curve (B(t)) and the target point sequence and optimizing the curve is required. In the present embodiment, a Bezier curve can be uniquely derived by extracting five points from a point sequence forming the curve. Hereinbelow, the content of the derivation will be more specifically described. Note that a Bezier curve used in the approximation is arranged such that a line segment P1P2 connecting the control points and a line segment P0P3 connecting the anchor points are parallel to each other.

Assuming that the line segment P1P2 and the line segment P0P3 are parallel to each other, the distance between a point Pf on the curve farthest from the line segment P0P3 and the line segment P0P3 is Df (first distance condition), the distance between the line segment P0P3 and the line segment P1P2 is Dc (second distance condition), (See FIG. 38), the relation in the following expression (2) is established.

$$Dc=(4/3) \times Df \quad (2)$$

By using the above expression (2), the control points P1 and P2 can be set in the position on the line segment away from the line segment P0P3 by the distance Dc. This processing is performed by the CPU 2914 in accordance with the flowchart of FIG. 31. First, in the curve smoothing processing at step S3101, the point sequence forming curves among the salient points are smoothed. More particularly, only a point sequence forming a curve except salient points are smoothed by using a smoothing filter or the like, thereby a point sequence drawing a smooth curve is generated. If the smoothing processing at step S3002 in FIG. 30 sufficiently eliminates noise in the point sequences, the curve smoothing processing at step S3101 in FIG. 41 is not necessarily performed.

In the curve dividing processing at step S3102, a curve formed with contour point sequence is divided (curve dividing) by a unit for approximation (replacement) of point sequence with one Bezier curve. The curve dividing will be described with reference to FIGS. 34A and 34B showing a particular example of curve dividing and FIG. 34C as a flowchart showing the curve dividing processing.

Figure 34A:
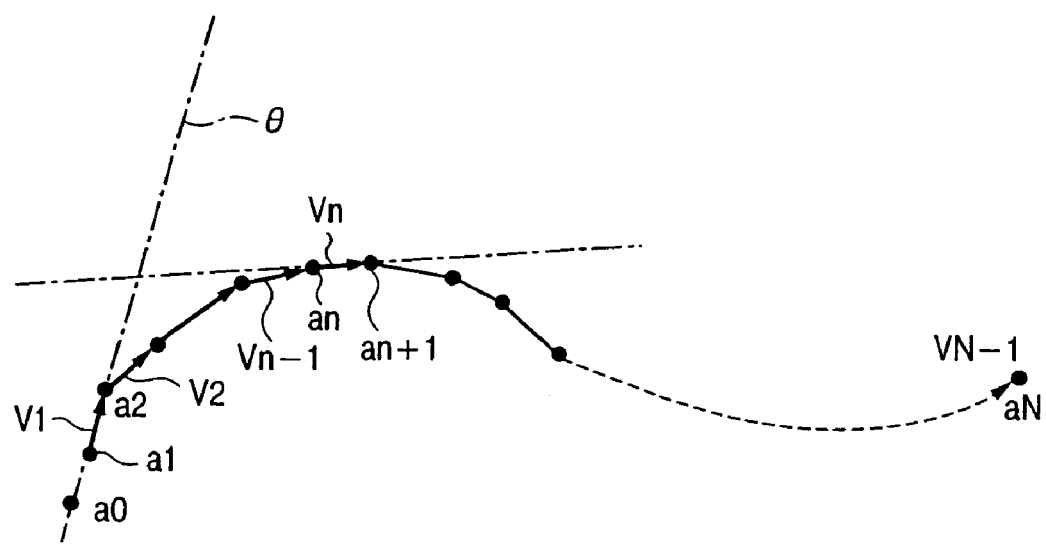
FIGS. 34A and 34B show a particular example of curve dividing.
Figure 34B:
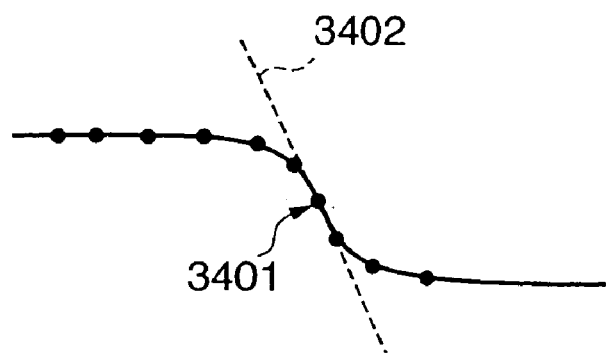

FIG. 34A shows a point sequence a0, a1, a2, . . . , an+1, . . . forming a curve including salient points a1 to an. First, at step S3401 in FIG. 34C, a counter (i) is initialized, then at step S3402, the CPU 2914 obtains vectors v1, v2, . . . , vN among the respective points. The vector v1 has the point a1 as a start point and the point a2 as a terminal point, and the vector v2 has the point a2 as a start point. The position information of start point and terminal point of the vector (Vi) is temporarily stored in the RAM 2913 or the disk drive 2917 for use in the following steps such that the information can be sequentially read by the CPU 2914 in accordance with necessity.

At step S3403, the CPU 2914 calculates an angle θi between the vector v1 having the start point a1 and another vector (vi(i=2, . . . , vN)), and compares the angle (θi) with a threshold angle θth. Note that it may be arranged such that the threshold angle θth is previously stored in the ROM 2915, otherwise, a value set by a user via the input unit 2910 is previously stored in the RAM 2913 or the disk drive 2917. Upon angle comparison, the CPU 2914 reads the threshold angle θth from the RAM 2913 or the ROM 2915, and compares the threshold angle with the calculated angle θi.

In the angle comparison, if the calculated angle (θi) is less than the threshold angle θth, the next vector is set as the subject of comparison (S3405), and the process returns to step S3403. The CPU 2914 calculates the angle θi between the vector v1 and the next vector (vi) and compares the angle θi with the threshold angle θth.

On the other hand, if the angle θi is greater than the threshold angle θth, the process proceeds to step S3404, at which, e.g., if i=n holds, the CPU 2914 sets the end point an of the vector vn as the terminal point (end point) of the curve dividing.

Figure 34C:
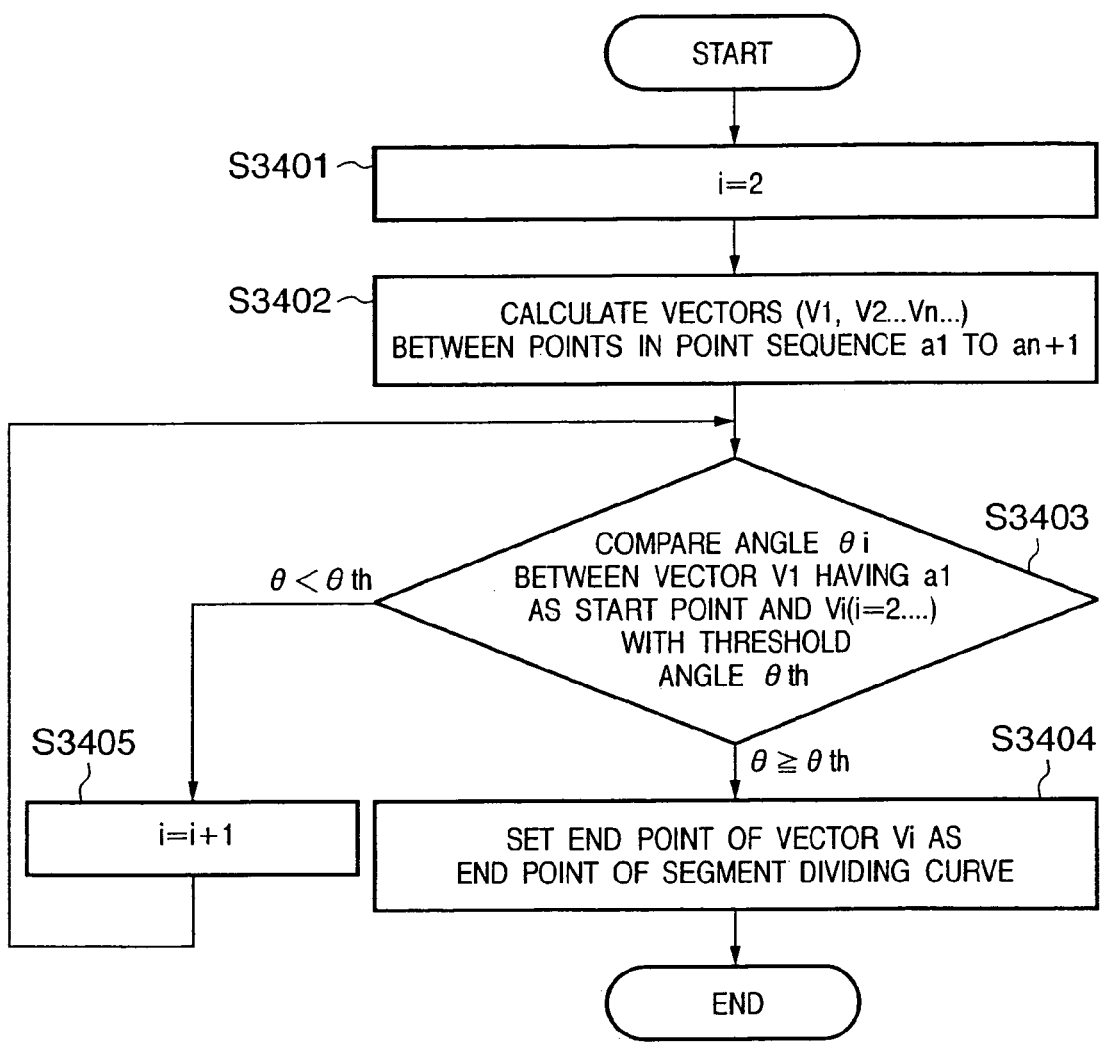
FIG. 34C is a flowchart showing curve dividing processing.

Further, the determination of end point is not limited to the method with reference to the threshold angle as described in the flowchart of FIG. 34C. For example, the CPU 2914 obtains the outer products of continuous vectors (v1×v2, v2×v3, . . . , vn−1×vn, . . . ), and the terminal point of a vector where the negative/positive sign has changed is set as the end point of the segment. In this case, the CPU 2914 stores the result of calculation of outer products of the respective vectors into the RAM 2913 or the disk drive 2917, and calculates the sign change while referring to the result of calculation.

FIG. 34B shows the result of calculation of outer products of continuous vectors. In FIG. 34B, in a point denoted by 3401, the slope to a tangent 3402 is zero and the sign changes. In this manner, the outer products of continuous vectors are obtained, and the end point of the curve (terminal point of the corresponding vector) can be obtained from the sign change.

A contour curve a1an of the segment, determined from the start point and terminal point obtained from the above processing, can be approximated with one Bezier curve.

Next, similar processing is repeated, with the point an obtained as an end point in the previous segment as a new start point, until a segment including the terminal point aN of the final vector vN−1 has been approximated with a Bezier curve. Thus, the curve point sequence between the salient points can be divided into segment curves which can be approximated with Bezier functions.

Note that various methods as well as the above method are applicable to the dividing of curve point sequence into segment curves. For example, the slope of vector is examined, and if the slope is a multiple of a predetermined threshold angle, the end point is determined as a terminal point. Any dividing method can be used as long as a point sequence can be divided to segments each can be approximated with one Bezier function, and the method employed in the dividing does not limit the subject matter of the present embodiment.

The position information of the start points and terminal points of the respective segment curves obtained by the above processing are stored into the storage means as shown in FIG. 41.

Figure 35:
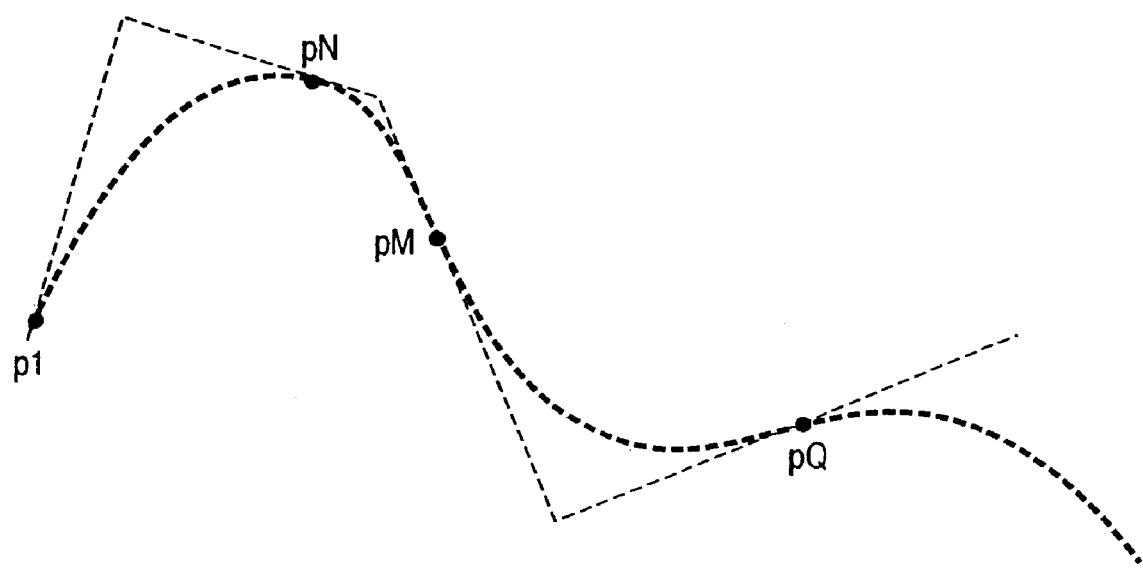
FIG. 35 shows segment curves p1$p$N, pNpM, pMpQ, . . .

Next, processing by the CPU 2914 to approximate the divided segment curve with a Bezier curve in a simplified manner will be described with reference to FIGS. 35 and 36, and FIGS. 39A and 39B. FIG. 35 shows segment curves p1$p$N, pNpM, pMpQ, . . . , and FIG. 36, divided one segment curve (p1$p$N).

Figure 36:
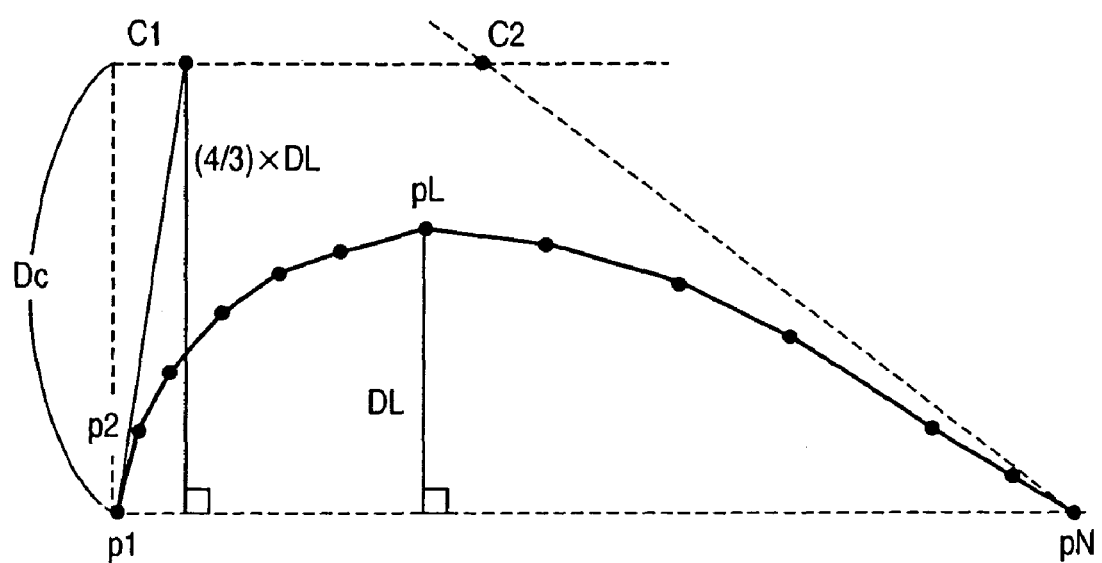
FIG. 36 is an explanatory view showing processing of simplified approximation on a divided segment curve with a Bezier curve, performed by a CPU 2914.

In FIG. 36, N points on the segment curve are p1, p2, . . . , pN. The start point of the segment curve is p1, and the terminal point is pN. These points are start point and terminal point (end points) obtained by the above-described dividing to segment curves (step S3910 in FIG. 39A). These points become anchor points of Bezier curve.

Figure 39A:
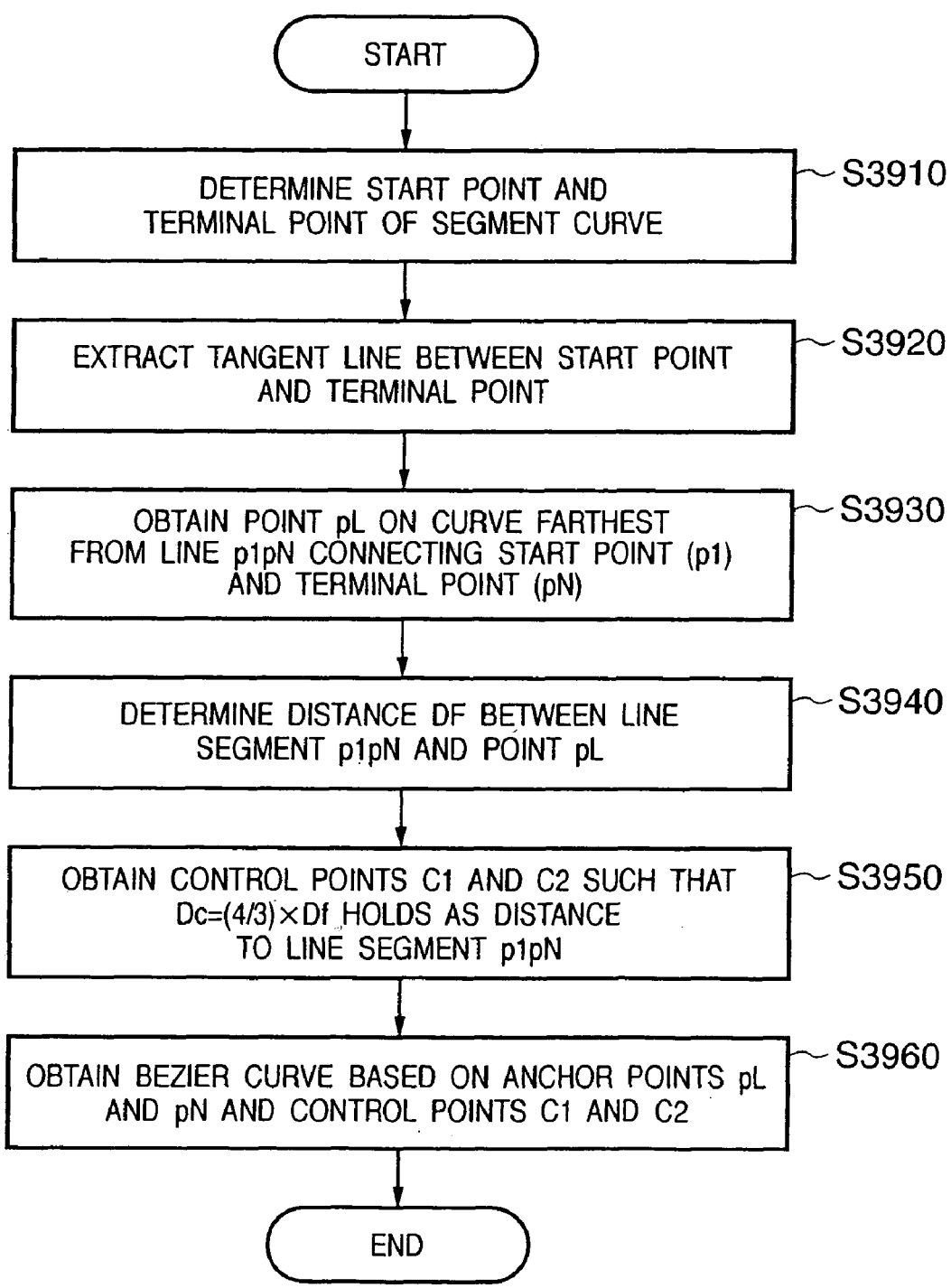
FIG. 39A is a flowchart showing processing of simplified approximation on a divided segment curve with a Bezier curve, performed by a CPU 2914.

Next, the CPU 2914 extracts tangent components in the respective anchor points p1 and pN (step S3920 in FIG. 39A). The tangent components are obtained from neighboring points of the points p1 and pN (e.g., the direction determined by a neighboring point a or b to the anchor point p1 in FIG. 40), and the extraction of tangent components can be extracted at the same time of the dividing to segments upon function approximation at step S3103 in FIG. 31.

The CPU 2914 compares position information of a point on a line segment satisfying the second distance condition given by the expression (2) and connecting the anchor points (P1 and P2 in FIG. 38), with position information of the points on the tangent, and determines intersection points where the both position information correspond with each other as control points (C1 and C2) of Bezier curve. Thus, a Bezier curve passing through the start point (p1) and the terminal point (pN), in contact with the respective tangents 4010 and 4020 can be obtained by the expression (1).

To determine the two control points (C1 and C2), the CPU 2914 obtains one characterizing point by processing at step S3930.

That is, at step S3930, a point pL on the curve, farthest from the line segment p1$p$N connecting the start point (p1) and the terminal point (pN), is obtained as a characterizing point, and the CPU 2914 determines the distance Df between the line segment p1$p$N and the characterizing point pL (S3940).

Note that the processing at step S3930 may be arranged such that a characterizing point group, including plural points around one characterizing point, is determined based on the relation with the line segment p1$p$N. The position information of the obtained characterizing point group is stored into the RAM 2913 or the disk drive 2917 by the CPU 2914, and can be read in correspondence with the progress of the subsequent respective processing steps. FIG. 41 shows an example of stored position information of one characterizing point in one segment.

Figure 39B:
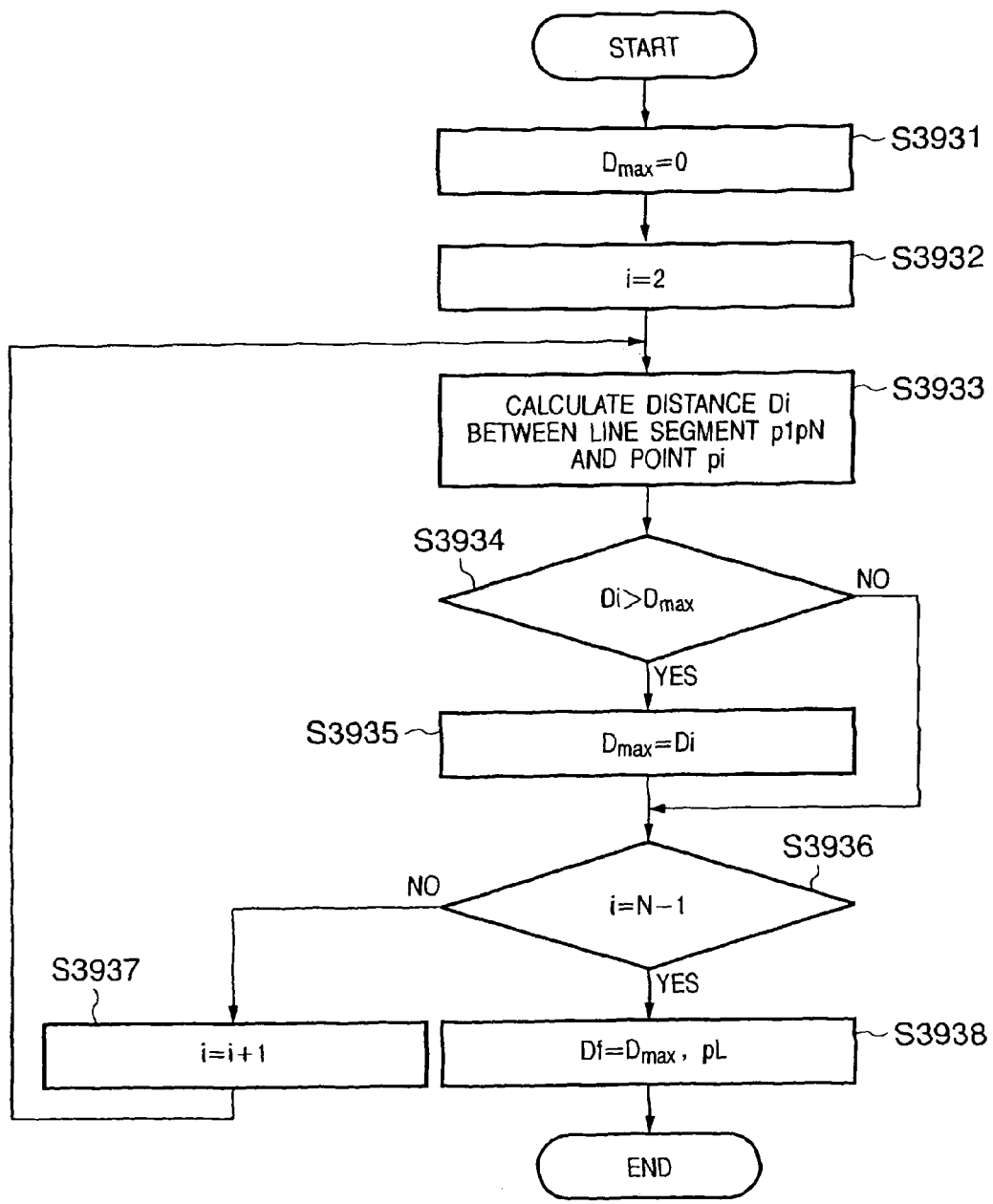
FIG. 39B is a flowchart showing processing of obtaining a maximum distance (Df) to a line segment based on anchor points.

FIG. 39B is a flowchart showing processing of determining the distance Df (see the expression (2)) by the CPU 2914. First, at steps S3931 and S3932, parameters (Dmax and i) are respectively initialized, and at step S3933, the CPU 2914 calculates a distance Di between the line segment p1$p$N and a point pi. At this time, the CPU 2914 calculates the distance Di based on the position coordinates of the point pi and the line segment p1$p$N. At step S3934, the CPU 2914 compares the distance Di obtained at step S3933 with the parameter Dmax indicating the maximum distance. If the calculated distance Di is greater than the parameter Dmax, the value of the parameter Dmax is updated at step S3935. If it is determined at step S3934 that the calculated distance Di is not greater than the parameter Dmax (NO at step S3934), the value of the parameter Dmax is not updated, and the process proceeds to step S3936. The value of the parameter Dmax is stored in the RAM 2913 or the disk drive 2917 such that the value can be read in computation processing by the CPU 2914.

At step S3936, the CPU 2914 determines whether or not distance calculation has been performed on all the points in the divided segment. If it is determined that the distance calculation has not been performed on all the points (NO at step S3936), the process proceeds to step S3937, at which the counter value (i) is incremented. Then the process returns to step S3933 to repeat the processing of calculating the distance to the line segment p1$p$N and the subsequent processing.

In the determination at step S3936, if the distance calculation on all the points in the segment has been completed (YES at step S3936), the process proceeds to step S3938, at which the distance Df between the line segment p1$p$N and a point pL farthest from the line segment (Df=Dmax) is determined.

The distance Df is determined by the above processing. Returning to FIG. 39A, the processing at step S3950 and the subsequent steps will be described.

In the present embodiment, for the sake of execution of simplified approximation processing with a Bezier function, approximation is made such that the line segment connecting the control points, C1C2 (FIG. 36) is parallel to the line segment p1$p$N connecting the anchor points. The CPU 2914 obtains the line segment such that distance Dc=(4/3)×Df holds as the distance to the line segment p1$p$N by the expression (2), and determines the intersection points between the line segment and the respective anchor points as the control points C1 and C2 (S3950).

The position information of the four points, the anchor points p1 and pN, and the control points C1 and C2, are stored in the storage means as shown in FIG. 41, and these values are read upon execution of approximation calculation with a Bezier curve. In the approximation calculation, a Bezier curve which passes through the start point p1 and the terminal point pN, and which is determined by the direction of the two control points C1 and C2 and the distance (Df), is obtained by the expression (1) (S3960).

As described above, upon approximation of segment curve with a cubic Bezier function, one point as a characterizing point on the segment curve is extracted as a point where the distance from a line segment connecting the start and terminal points of the segment is maximum. The control points (C1 and C2) to determine a Bezier curve are uniquely determined from the characterizing point, thereby the amount of computation processing can be greatly reduced. The processing according to the present embodiment is very effective when a vast amount of contour data is approximated with Bezier curves at a high speed.

Sixth Embodiment

In the fifth embodiment, the approximation processing with a Bezier function is performed based on five points (two anchor points, two control point and one characterizing point), however, the accuracy of approximation on the point sequence of segment curve may be degraded in accordance with, e.g., the accuracy of curve dividing at step S3102 in FIG. 31. In such case, it is determined whether or not the function approximation is excellently performed, and based on the result of determination, the function approximation is performed again, thereby the accuracy in the function approximation can be improved.

Figure 37:
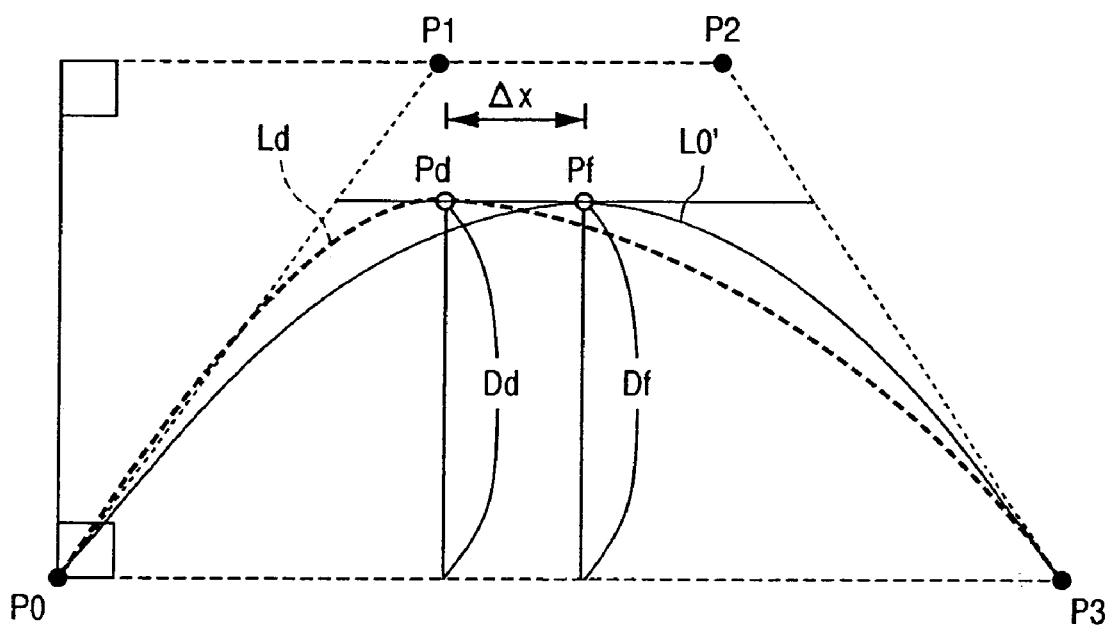
FIG. 37 is an explanatory view showing processing according to a sixth embodiment.

FIG. 37 is an explanatory view showing the processing according to the sixth embodiment. In this example, a segment curve Ld indicated by a dotted line is approximated with a Bezier function and a curve L0' is obtained by using a characterizing point Pd away from a line segment P0P3 by a maximum distance (Dd). As the curve L0' is obtained by similar processing to that in the fifth embodiment, the explanation of the processing will be omitted.

The CPU 2914 compares a point Pf (a point on approximated curve away from the line segment P0P3 by the maximum distance) on the curve L0' obtained by the function approximation with the characterizing point Pd on the segment curve. If the difference between the position coordinates of both points ($\Delta x$, $\Delta y$ (=Dd−Df)) is within allowable threshold coordinates ($\Delta xalw$, $\Delta yalw$), the CPU 2914 determines that the function approximation on the curve has been excellently performed, and confirms the divided segment and the function in the approximation of the segment curve.

On the other hand, if the difference between the position coordinates ($\Delta x$, $\Delta y$ (=Dd−Df)) is without the allowable threshold coordinates ($\Delta xalw$, $\Delta yalw$), the CPU 2914 determines that there is a high probability that the function approximation based on the first segment has produced a large error and the original segment curve is not drawn. To re-divide the divided segment, the CPU 2914 sets a point pd as a new anchor point, and divides the range of the initially-divided segment P0 to P3 to two segments, P0 to Pd and Pd to P3. Then the CPU 2914 performs function approximation processing on the respective segment curves as in the case of the fifth embodiment. In this manner, the accuracy of function approximation can be improved by adding a new anchor point and performing segment redividing.

Further, after the segment redividing, the CPU 2914 compares the difference between position coordinates and the allowable range, and if the difference between position coordinates is without the allowable range, the CPU 2914 further repeats the segment dividing, thereby corrects segment dividing such that the difference of curve approximation stands within the allowable range. According to the sixth embodiment, the determination of accuracy of approximated Bezier curve is performed by each divided segment, thereby the accuracy of approximation calculation can be ensured.

Seventh Embodiment

In the fifth embodiment, the approximation processing with a Bezier function is performed based on five points (two anchor points, two control point and one characterizing point), however, it may be arranged such that, e.g., in the processing at step S3930, the CPU 2914 sequentially reads the plural characterizing points stored in the RAM 2913 or the disk drive 2917 regarding the line segment $p1pN$, obtains Bezier curves based on the respective points, and determines a most appropriate approximated curve (e.g., satisfying the condition that the positional error between corresponding points is a minimum) for the contour point sequence as a divided curve.

According to the fifth to seventh embodiments, the approximation of contour of binary image extracted from input computerized data can be performed at a high speed by using a Bezier curve.

Further, the accuracy of approximation calculation can be ensured by performing determination of accuracy of approximated Bezier curve by each divided segment.

The present invention can be applied to a system constituted by a plurality of devices (e.g., a host computer, an interface, a reader and a printer) or to an apparatus comprising a single device (e.g., a copy machine or a facsimile apparatus). More particularly, for high-quality scaling in a multi-function apparatus, a copier or a facsimile apparatus, the present invention is applicable to extraction of contour vector when scanned image data is inputted (image data may be inputted from a public line or network), contour vectors are extracted from the image data, the extracted contour vectors are scaled, image data is generated from the scaled contour vectors, and the generated image data is print-outputted.

Further, the object of the present invention can also be achieved by providing a storage medium holding software program code for performing the aforesaid processes to a system or an apparatus, reading the program code with a computer (e.g., CPU, MPU) of the system or apparatus from the storage medium, then executing the program.

In this case, the program code read from the storage medium realizes the functions according to the embodiments, and the storage medium holding the program code constitutes the invention.

Further, the storage medium, such as a floppy disk (registered trademark), a hard disk, an optical disk, a magneto-optical disk, a CD-ROM, a CD-R, a DVD, a magnetic tape, a non-volatile type memory card, and ROM can be used for providing the program code.

Furthermore, besides aforesaid functions according to the above embodiments are realized by executing the program code which is read by a computer, the present invention includes a case where an OS (operating system) or the like working on the computer performs a part or entire actual processing in accordance with designations of the program code and realizes functions according to the above embodiments.

Furthermore, the present invention also includes a case where, after the program code read from the storage medium is written in a function expansion card which is inserted into the computer or in a memory provided in a function expansion unit which is connected to the computer, CPU or the like contained in the function expansion card or unit performs a part or entire process in accordance with designations of the program code and realizes functions of the above embodiments.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application Nos. 2004-130192 filed on Apr. 26, 2004 and 2004-161571 filed on May 31, 2004, which are hereby incorporated by reference herein.

What is claimed is:

1. A function approximation processing method comprising:
performing by a processor the following steps:
an input step of inputting image data;
a binarization step of binarizing the input image data;
a contour extraction step of extracting line segments of horizontal and vertical directions from the binarized image data;
a tangent line segment extraction step of extracting, as a tangent line segment, a line segment that has a length satisfying predetermined conditions from the extracted line segments of horizontal and vertical directions;
an anchor point extraction step of extracting, as an anchor point, a point on the extracted tangent line segment, wherein the anchor point is an endpoint on the extracted tangent line segment in a case where a line segment adjacent to the extracted tangent line segment is a tangent line segment, or the anchor point is a point that corresponds to an end point on the extracted tangent line segment that is shifted, in a case where the line segment adjacent to the extracted tangent line segment is not a tangent line segment;
a curve approximation processing step of performing curve approximation processing in which a line segment between anchor points that are respectively extracted in the anchor point extraction step is approximated to a curve; and
a correction step of replacing the curve approximated in the curve approximation processing step with a diagonal straight line in a case where the line segment approximated in the curve approximation processing step was originally a diagonal straight line.

2. The function approximation processing method according to claim 1, wherein at said contour extraction step, the contour of said image is extracted by extracting a profile line so as to trace the periphery of said image while handling one pixel of said image as a square element formed with four points.

3. The function approximation processing method according to claim 1, wherein, in the tangent line segment extraction step, a straight line pattern in said horizontal and vertical directions is detected by pattern matching, and extraction is made based on relative positional relation between the detected straight line pattern and neighboring contour pixels.

4. The function approximation processing method according to claim 1, wherein the curve approximation processing step has:
first approximation processing of allocating one quadratic Bezier curve, one cubic Bezier curve or a straight line to a contour line segment group between tangent points where a number of contour line segments between said tangent points is smaller than a predetermined value; and
second approximation processing of allocating one or plural cubic Bezier curves to a contour line segment group between tangent points where the number of contour line segments between said tangent points is larger than a predetermined value.

5. The function approximation processing method according to claim 4, wherein in said first approximation processing, any one of a quadratic Bezier curve, a cubic Bezier curve or a straight line is allocated in correspondence with the result of detection of straight line pattern in said horizontal and vertical directions in said tangent line segment extraction step.

6. The function approximation processing method according to claim 4, wherein said second approximation processing is allocating one or plural cubic Bezier curves to a contour line segment group, and in use of the cubic Bezier curve, a straight line connecting anchor points and a straight line connecting control points are parallel to each other.

7. The function approximation processing method according to claim 1, wherein, in the curve approximation processing step, approximation processing is performed on a contour line segment group between tangent points where a number of contour line segments between said tangent points is smaller than a predetermined value, based on the relative positional relation between said tangent points.

8. A function approximation processing apparatus comprising:
input means for inputting image data;
binarization means for binarizing the input image data;
contour extraction means for extracting line segments of horizontal and vertical directions from the binarized image data;
tangent line segment extraction means for extracting, as a tangent line segment, a line segment that has a length satisfying predetermined conditions from the extracted line segments of horizontal and vertical directions;
anchor point extraction means for extracting, as an anchor point, a point on the extracted tangent line segment, wherein the anchor point is an end point on the extracted tangent line segment in a case where a line segment adjacent to the extracted tangent line segment is a tangent line segment, or the anchor point is a point that corresponds to an end point on the extracted tangent line segment that is shifted, in a case where the line segment adjacent to the extracted tangent line segment is not a tangent line segment;
curve approximation processing means for performing curve approximation processing in which a line segment between anchor points that are respectively extracted in the anchor point extraction step is approximated to a curve; and
correction means for replacing the curve approximated in the curve approximation processing step with a diagonal straight line in a case where the line segment approximated in the curve approximation processing step was originally a diagonal straight line.

9. A non-transitory computer-readable storage medium storing a program for executing the function approximation method of claim 1 by a computer.

10. The method according to claim 1, wherein in the anchor point extraction step, in a case where a vector V1 of a line segment adjacent to a vector V2 of the extracted tangent line segment is a tangent line segment, an end point on the vector V2 is extracted as an anchor point, or in a case where the vector V1 of a line segment adjacent to the vector V2 of the extracted tangent line segment is not a tangent line segment, a point away from an end point on the vector V2 by a|V1| (wherein "a" is a scalar multiplier) or the central point of the vector V2 is extracted as an anchor point.

* * * * *